US007903816B2

(12) United States Patent
Fujimoto et al.

(10) Patent No.: US 7,903,816 B2
(45) Date of Patent: *Mar. 8, 2011

(54) STORAGE SYSTEM EXECUTING ENCRYPTION AND DECRYPTION PROCESSING

(75) Inventors: Kazuhisa Fujimoto, Tokyo (JP); Makio Mizuno, Sagamihara (JP); Dai Watanabe, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 325 days.

This patent is subject to a terminal disclaimer.

(21) Appl. No.: 12/106,391

(22) Filed: Apr. 21, 2008

(65) Prior Publication Data
US 2009/0010432 A1 Jan. 8, 2009

Related U.S. Application Data

(63) Continuation of application No. 10/951,771, filed on Sep. 29, 2004, now Pat. No. 7,372,962.

(30) Foreign Application Priority Data

Apr. 6, 2004 (JP) ................................. 2004-111680
Aug. 10, 2004 (JP) ................................. 2004-232893

(51) Int. Cl.
*H04K 1/00* (2006.01)
(52) U.S. Cl. ......... 380/255; 380/284; 713/150; 713/189; 713/193
(58) Field of Classification Search .................. 380/255, 380/284; 713/150, 189, 193
See application file for complete search history.

(56) References Cited

U.S. PATENT DOCUMENTS

| 6,212,633 | B1 | 4/2001 | Levy et al. |
| 6,314,426 | B1 | 11/2001 | Martin et al. |
| 6,915,434 | B1 | 7/2005 | Kuroda et al. |
| 6,973,455 | B1 | 12/2005 | Vahalia et al. |
| 7,055,059 | B2 | 5/2006 | Yanai et al. |
| 2002/0188856 | A1 | 12/2002 | Worby |
| 2003/0163568 | A1 | 8/2003 | Yoshiki et al. |
| 2003/0191932 | A1 | 10/2003 | Allen et al. |
| 2005/0204154 | A1 | 9/2005 | Osaki |

FOREIGN PATENT DOCUMENTS

| JP | 2001-325207 | 11/2001 |
| JP | 2002-215598 | 8/2002 |

OTHER PUBLICATIONS

Office Action in Japanese Patent Appln. 2004-232893, dated Nov. 19, 2009 with partial English translation.
Aboba, B. et al. *IPS Working Group: Internet-Draft "Securing Block Storage Protocols Over IP"*, <draft-ietf-ips-security-15.txt> Aug. 21, 2002, The Internet Society.

*Primary Examiner* — Thanhnga B Truong
(74) *Attorney, Agent, or Firm* — Antonelli, Terry, Stout & Kraus, LLP.

(57) ABSTRACT

A storage system 1 includes a channel interface (IF) unit 11 having an interface with a server 3, a disk IF unit 16 having an interface with a hard disk group 2, a memory unit 21 for storing data to be read/written from/to the server 3 or the hard disk group 2, a switching unit 51, and the hard disk group 2. The channel IF unit 11, the disk IF unit 16, and the memory unit 21 are connected to each other through the switching unit 51, and an encryption and decryption processing unit 201 is provided between a host IF unit 101 and a transfer controller 103 in the channel IF unit 11.

8 Claims, 28 Drawing Sheets

STORAGE SYSTEM EXECUTING ENCRYPTION AND DECRYPTION PROCESSING

CROSS-REFERENCES TO RELATED APPLICATION

This application is a continuation of application Ser. No. 10/951,771, filed Sep. 29, 2004 now U.S. Pat. No. 7,372,962, which relates to and claims priority from Japanese Patent Application No. 2004-232893, filed on Aug. 10, 2004, the entire disclosure of which is incorporated herein by reference.

BACKGROUND OF THE INVENTION

The present invention relates to a storage system which is capable of executing an encryption (or decryption) process (hereinafter referred to as 'encryption and decryption processes') on data and of executing a high-security (hereinafter referred to simply as 'secure') data communication with a computer (hereinafter referred to as 'a server') or another storage apparatus system (hereinafter referred to as 'a storage system').

Conventionally, fiber channel (hereinafter referred to as 'FC') interfaces have been mainly used as interfaces for effecting data communication between a server and a storage system. However, in recent years, the use of the Ethernet (a registered trademark of Fuji Xerox. Co., Ltd.) enables high-speed data communication at a speed equal to or more than that of a FC at a low cost. In addition, the advent of iSCSI (internet Small Computer System Interface) technology in which data communication by SCSI (Small Computer System Interface) protocol is realized over an IP (Internet Protocol) network makes it possible to construct a storage area network (hereinafter referred to as a 'SAN') with the IP network, such as the Ethernet, which is conventionally realized by using FC connections.

However, an FC network is commonly used in a closed environment, such as within the confinement of a company building, but an IP network is typically used inside or outside an enterprise as a general network, that is, in an open environment. Therefore, there is an increasing possibility that apparatuses connected to the IP network are susceptible to an unauthorized entry or to hostile break-in by a third party. Thus, when connecting a storage system to an IP network, it is becoming more indispensable to take necessary security measures for protection of the storage system.

One of the security measures is to apply a data encrypting technique for securing a data communication over an IP network to a storage system. Currently, IPsec (disclosed in RFC2406), which is prescribed as a standard protocol for a VPN (Virtual Private Network) by the IETF (Internet Engineering Task Force), which is one of the organizations for setting Internet standards, is widely used as a protocol for securing data communications over an IP network.

As shown in FIG. 19, in mounting encryption and decryption processing units in a storage system, encryption and decryption processing units 301 are provided in the front stages of host IFs 101 in channel IF units 12, or they are provided in the host IFs 101 (not shown).

SUMMARY OF THE INVENTION

An encryption algorithm adopted in the IPsec protocol is a so-called block cipher. In the block cipher, plaintext having an arbitrary length is divided into a plurality of blocks having a uniform length from its head, and an encryption process is performed for every block. Therefore, the maximum speed of the encryption process performed by one encryption and decryption processing circuit is several gigabits per second.

However, in the current storage system, the speed of data transmission per channel with the server is 1 Gbps, and it is anticipated that the speed of data transmission will reach 10 Gbps in a few years. Thus, when the block cipher is used, it is necessary for a plurality of encryption and decryption processing circuits to execute encryption and decryption processes in parallel in order to cope with the high-speed data transmission of 10 Gbps.

Further, in the IP protocol, data is divided into packets, each having a small length of about 1 kB for transmission. Accordingly, in the Ipsec protocol, the encryption process is executed in units of a data packet of the IP protocol. Thus, in a storage system requiring transmission and reception of a large amount of data, the efficiency of the encryption process deteriorates. Here, in order to improve the efficiency of data transmission in the IP protocol, it is considered that a packet having a length of about 10 kB, which is referred to as a jumbo packet, can be used for data communication. However, when a long packet is used for data communication, the average length of the packets is as long as 1 kB, since a number of control packets are mixed in the data communication at regular intervals, which deteriorates the efficiency of the encryption and decryption processes.

Particularly, at the time of a copy of data between storage systems to transmit or receive a large amount of data in a short period of time, that is, at the time of remote copy or backup, the deterioration of the efficiency of the encryption and decryption processes may cause a bottleneck in the system and decrease its performance.

In order to solve the above-mentioned problems, an embodiment of the invention has the following configuration. More specifically, a storage system according to the invention comprises a first interface unit having a connecting unit connected to a computer; a second interface unit having a connecting unit connected to a disk device; a memory unit; and the disk device. The first interface unit, the second interface unit, and the memory unit are connected to each other by an interconnecting network. The first interface unit has an encryption and decryption processing unit for encrypting data to be transmitted to the computer and for decrypting data received from the computer.

In addition, the first interface unit has a first connecting unit connected to the computer and a second connecting unit connected to the interconnecting network, and the encryption and decryption processing unit is provided between the first connecting unit and the interconnecting network.

Further, a stream cipher is preferably used as an encryption algorithm of the encryption and decryption processing unit.

Furthermore, another embodiment of the invention has the following configuration. Specifically, a storage system has two types of encryption and decryption processing units having different encryption algorithms. That is, the storage system comprises a first interface unit having a connecting unit connected to a computer; a second interface unit having a connecting unit connected to a disk device; a memory unit; and the disk device. Herein, the first interface unit, the second interface unit, and the memory unit are connected to each other by an interconnecting network. The first interface unit further comprises a first connecting unit connected to the computer; a second connecting unit connected to the interconnecting network; a first encryption and decryption processing unit for encrypting or decrypting data to be read or written from or to the computer; and a second encryption and decryption processing unit having a different encryption algorithm from that of the first encryption and decryption processing unit.

Further, the first encryption and decryption processing unit is provided between the computer and the first connecting unit, and the second encryption and decryption processing unit is provided between the first connecting unit and the interconnecting network.

Further, a block cipher is used as the encryption algorithm of the first encryption and decryption processing unit, and a stream cipher is used as the encryption algorithm of the second encryption and decryption processing unit.

Furthermore, the problems disclosed above and the means for solving these problems will be apparent from the following description of the preferred embodiments and the accompanying drawings.

DESCRIPTION OF THE PREFERRED EMBODIMENTS

Figure 1:
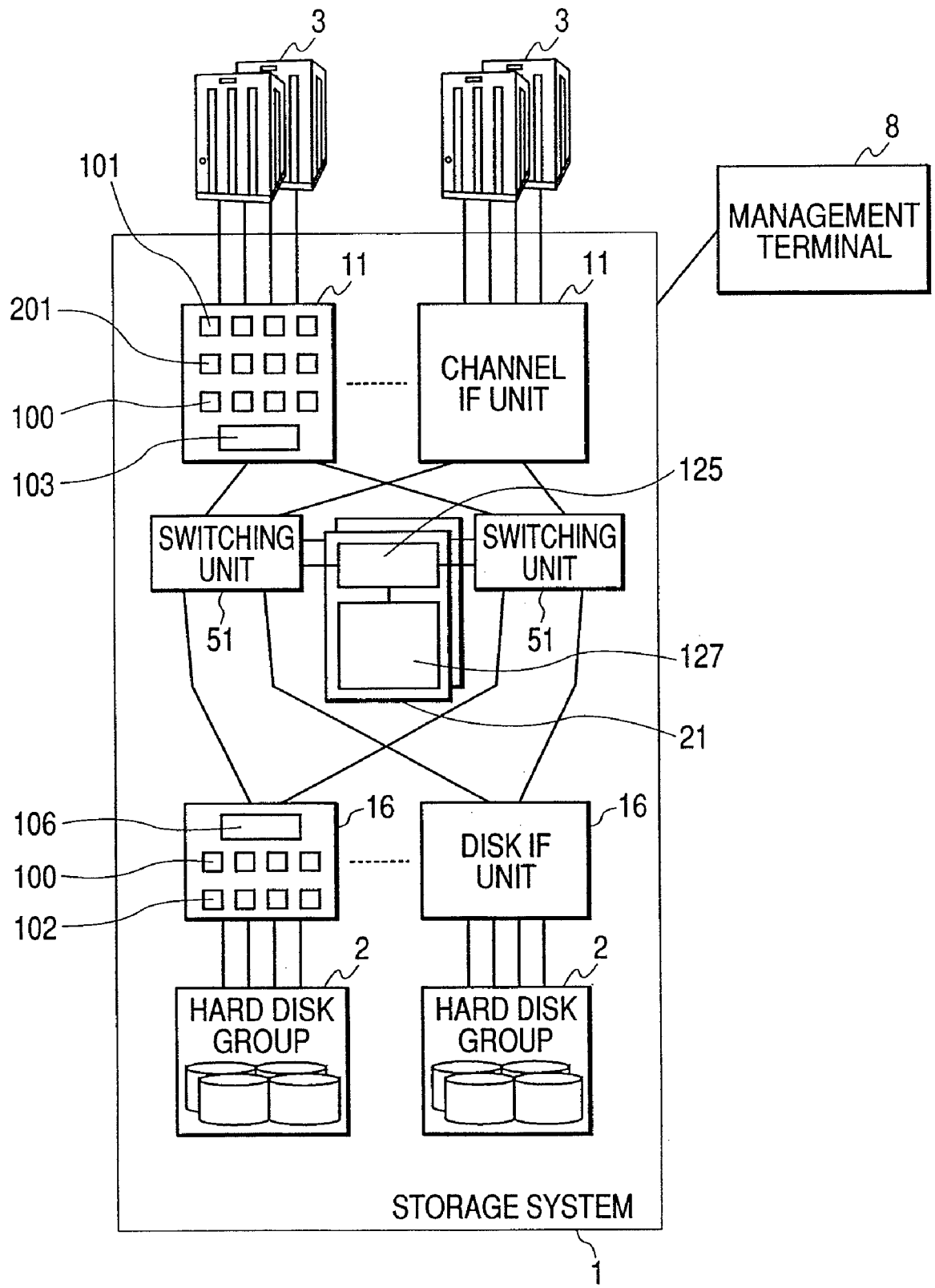
FIG. 1 is a block diagram illustrating the configuration of a storage system according to a first embodiment of the present invention.

FIG. 1 is a block diagram illustrating the configuration of a system including a storage system according to a first embodiment of the present invention. The system comprises a storage system 1 and servers 3. Hereinafter, it is assumed that an storage system 1 and the servers 3 are connected to each other through an IP network. However, networks other than the IP network, such as a FC network and the like, can be used. The storage system 1 is a storage apparatus comprising a plurality of recording media (a hard disk drive, an optical disk, a semiconductor memory, and the like) and a control unit. The storage system 1 has channel interface (IF) units 11 for transmitting or receiving data to or from the servers 3, disk IF units 16 for transmitting or receiving data to or from hard disk groups 2, switching units 51, memory units 21, and the hard disk groups 2. The channel IF unit 11 and the disk IF unit 16 are connected to the memory unit 21 through the switching unit 51.

Further, a management terminal 8 is connected to the storage system 1 to perform the setup and monitoring of the storage system 1 and the collection of information on the operation and failure of the storage system 1. The management terminal 8 is connected to microprocessors 100 of the channel IF units 11 and the disk IF units 16 in the storage system 1 through a network.

The channel IF unit 11, the disk IF unit 16, and the memory unit 21 are connected to each other by two switching units 51 and a communication path. Herein, the communication path is a transmission line composed of a single or a plurality of signal lines used to transmit data or control information. In this way, two communication routes are secured among the channel IF unit 11, the disk IF unit 16, and the memory unit 21, so that the reliability of the storage system can be improved. Herein, since the number of elements or lines specified above is just an example, the number of them is not limited thereto, which is also applicable to all embodiments to be described later.

Furthermore, according the present embodiment, the channel IF unit 11, the disk IF unit 16, and the memory unit 21 are connected to each other through the switching units 51. However, these units may be connected to each other through a common bus to transmit control information or data.

The memory unit 21 comprises a memory module 127 and a memory controller 125. The memory module 127 is logically divided into two areas. One area is a cache memory area in which data to be written to or read out from the hard disk group 2 is temporally stored (hereinafter, referred to as 'cached'). The other area is a control memory area in which the directory information (information on logical partition for the data stored in the cache memory) of the cache memory area, information for controlling the data transmission among the channel IF unit 11, the disk IF unit 16, and the memory unit 21, information on the management and configuration of the storage system 1, and the like are stored. The memory controller 125 controls the read or write (hereinafter, referred to as 'read/write') of data from or to the memory module 127.

Further, the memory controller 125 controls the transmission of data/control information among the channel IF unit 11, the disk IF unit 16, and the memory unit 21.

Herein, the memory module 127 may be physically divided into two modules, more specifically, a cache memory module and a control memory module. In this case, the read/write of data from/to the two memory modules are separately controlled in the memory controller 125. In addition, the memory controller 125 may be divided into a part for controlling the cache memory module and another part for controlling the control memory module.

In addition, the data or control information to be stored in the memory module may be duplexed (replicated and stored in both sides) between two memory units 21 in the storage system 1. In this case, even when a failure occurs in a memory module in one of the two memory units 21, the storage system 1 can be continuously operated using the data stored in a memory module in the other memory unit 21, thereby improving the reliability of the storage system 1.

Further, the hard disk group 2 is an example of the storage media included in the storage system. The hard disk group 2 consists of a plurality of hard disk drives, similar to a disk array, or may be RAID (Redundancy Array of Independent Disks) configuration.

Figure 2:
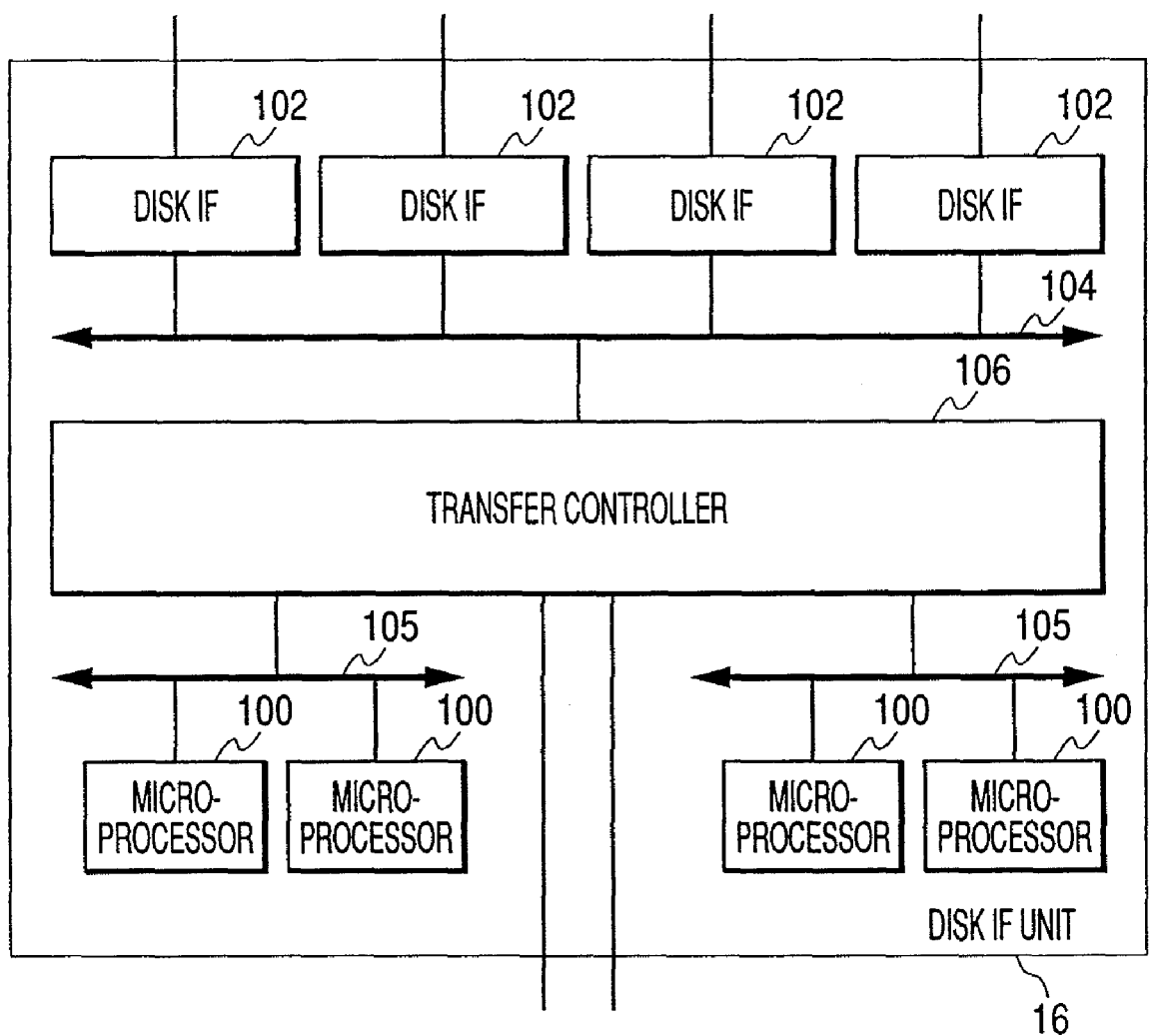
FIG. 2 is a block diagram illustrating the configuration of a disk IF unit.

FIG. 2 is a view more specifically illustrating the configuration of the disk IF unit 16.

The disk IF unit 16 comprises four disk IFs 102 connected to the hard disk group 2, microprocessors 100 for controlling the input or output of data to or from the server 3 or the hard disk group 2 and the input or output of data to or from the memory unit 21, and a transfer controller 106 for controlling the transmission of data/control information to the memory unit 21.

The disk IFs 102 are connected to the transfer controller 106 through a common bus 104. In addition, the microprocessors 100 are connected to the transfer controller 106 through a common bus 105.

Herein, the above-mentioned connection configuration between the transfer controller 106 and the disk IFs 102 or the microprocessors 100 is just one example, and the connection configuration therebetween is not limited thereto. Alternatively, a configuration in which data can be transmitted from the disk IFs 102 to the memory unit 21 via the transfer controller 106 may be used. In addition, a configuration in which the microprocessors 100 can control the disk IFs 102 and the transfer controller 106 and access the memory unit 21 may be adopted.

The microprocessor 100 controls the read/write of data from/to the cache memory area of the memory module 127 in the memory unit 21, the directory management of the cache memory area, and the data transmission between the disk IFs 102 and the memory unit 21, based on the control information stored in the control memory area of the memory module 127 in the memory unit 21.

More specifically, for example, the microprocessor 100 in the channel IF unit 11 writes, in the control memory area of the memory module 127 in the memory unit 21, control information representing a request for reading/writing data from/to the cache memory area of the memory module 127 in the memory unit 21. Then, the microprocessor 100 in the disk IF unit 16 reads out the control information to analyze it and then transmits, to the disk IF 102 and the transfer controller 106, the control information representing to which memory unit 21 data is to be transmitted from the disk IF 102 (or the opposite direction thereto) and parameters necessary for the data transmission. The disk IF 102 commands the transfer controller 106 to start transmitting data according to the control information and the parameters. When data is transmitted from the disk IF 102 to the memory unit 21, the disk IF 102 transmits data to the transfer controller 106, and then the transfer controller 106 outputs a write request of data to the memory unit 21 and transmits the received data to the memory unit 21 in a predetermined packet, based on the above-mentioned control information received from the microprocessor 100 and the parameters necessary for the transmission of data. When data is transmitted from the memory unit 21 to the disk IF 102, the transfer controller 106 outputs a read request of data to the memory unit 21 and receives the read data from the memory unit 21 to transmit the received data to the disk IF 102 in a predetermined packet, based on the above-mentioned control information received from the microprocessor 100 and the parameters necessary for the transmission of data.

Further, the microprocessor 100 performs a redundancy process of data to be written to the hard disk group 2 connected to the disk IF 102, i.e., a so-called RAID process (RAID1, RAID 4, RAID 5, or the like). The RAID process may be performed in the channel IF unit 11 or the memory unit 21. In addition, the microprocessor 100 performs the management (logical-to-physical conversion) of a storage area in the storage system 1.

Figure 3:
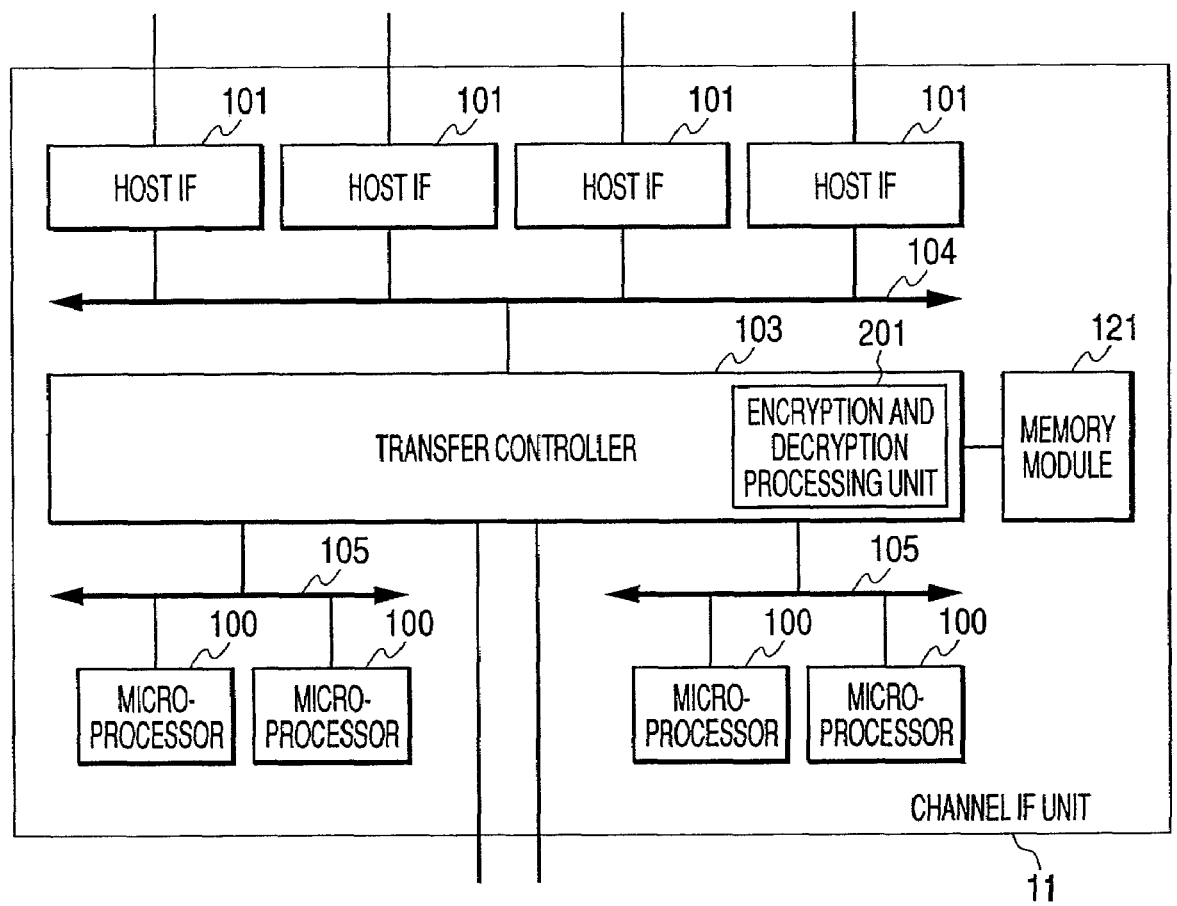
FIG. 3 is a block diagram illustrating the configuration of a IF channel unit.

FIG. 3 is a view more specifically illustrating the configuration of the channel IF unit 11.

The channel IF unit 11 comprises four host IFs 101 connected to the server 3, microprocessors 100 for controlling the input or output of data to or from the server 3 and for controlling the input or output of data to or from the memory unit 21, a transfer controller 103 for controlling the transmission of data/control information to the memory unit 21, and a memory module 121 for performing data buffering and the storage of control information.

Hereinafter, the host IF 101 will be described as an interface for processing an iSCSI protocol. However, the host IF 101 may be an interface for processing protocols other than the iSCSI protocol.

The host IFs 101 are connected to the transfer controller 103 through the common bus 104. In addition, the memory module 121 is connected to the transfer controller 103. The transfer controller 103 also functions as a memory controller for controlling the read/write of data/control information from/to the memory module 121. Further, the microprocessors 100 are connected to the transfer controller 103 through a common bus 105. The transfer controller 103 has two communication paths for connecting to two switching units 51.

Herein, since the above-mentioned connection configuration between the transfer controller 103 and the host IFs 101, the microprocessors 100, or the memory module 121 is just one example, the configuration therebetween is not limited thereto. Alternatively, a configuration in which data can be transmitted from the host IF 101 to the memory unit 21 via the transfer controller 103 may be adopted. In addition, a configuration in which the microprocessor 100 can control the host IF 101 and the transfer controller 103 and access the memory module 121 and the memory unit 21 may be adopted.

The microprocessor 100 controls the read/write of data from/to the cache memory area of the memory module 127 in the memory unit 21, the directory management of the cache memory area, and the data transmission between the host IFs 101 and the memory unit 21, based on the control information stored in the control memory area of the memory module 127 in the memory unit 21.

More specifically, for example, the host IF 101 writes control information representing an access request, such as the read or write of data, in a main memory of the microprocessor 100. Then, the microprocessor 100 reads out the control information to analyze it, and then transmits, to the host IF 101 and the transfer controller 103, the control information representing to which memory unit 21 data is to be transmitted from the host IF 101 and the parameters necessary for the data transmission. The host IF 101 commands the transfer controller 103 to start transmitting data according to the control information and the parameters. When data is transmitted from the host IF 101 to the memory unit 21, the host IF 101 transmits data to the transfer controller 103, and then the transfer controller 103 outputs a write request of data to the memory unit 21 and transmits the received data to the memory unit 21 in a predetermined packet, based on the above-mentioned control information received from the microprocessor 100 and the parameters necessary for the data transmission. When data is transmitted from the memory unit 21 to the host IF 101, the transfer controller 103 outputs a read request of data to the memory unit 21 and receives the read data from the memory unit 21 to transmit the received data to the host IF 101 in a predetermined packet, based on the above-mentioned control information received from the microprocessor 100 and the parameters necessary for the data transmission.

Further, the microprocessor 100 performs management (logical-to-physical conversion) of the storage area in the storage system 1.

Furthermore, the transfer controller 103 has an encryption and decryption processing unit 201 for encrypting or decrypting data.

When the server 3 requests a read of data, the storage system 1 reads out data from the cache memory area (or the hard disk group 2) in the memory unit 21 and transmits the read data to the server 3. Herein, when an IP protocol (including the iSCSI protocol) is used for data transmission between the server 3 and the storage system 1, the channel IF unit 11 of the storage system 1 temporarily stores the data read out from the cache memory area in the memory module 121. Subsequently, the channel IF unit 11 transmits data from the memory module 121 to the host IF 101, and then the host IF 101 converts the received data into a packet format of the IP protocol to transmit the data to the server 3. The reason for temporarily storing the read data in the memory module 121 is to provide protection against a case in which the retransmission of data occurs on an IP network. That is, in the case of the retransmission of data, when data is not temporarily stored in the memory module 121, it is necessary for the channel IF unit 11 to read out data from the memory unit 21 and the like once more, which results in deterioration of the performance at the time of the retransmission of data. In order to prevent such a situation, the channel IF unit 11 temporarily stores data in the memory module 121.

In the present embodiment, the channel IF unit 11 encrypts the data read from the cache memory area of the memory unit 21 in the encryption and decryption processing unit 201 and then stores it in the memory module 121. The reason for encrypting the data to be stored before storing the data in the memory module 121 is that, if an encryption process is performed when data is transmitted from the memory module 121 to the host IF 101, the encryption process will be performed on the data whenever the retransmission of data occurs, which results in a deterioration of the performance.

When the server 3 requests the write of data, the host IF 101 of the channel IF unit 11 extracts data from the received data packet of the IP protocol to convert the data into a packet format of the storage system 1, and then transmits the converted data to the memory module 121. Subsequently, the encryption and decryption processing unit 201 of the transfer controller 103 decrypts the data and then transmits it to memory unit 21.

Figure 19:
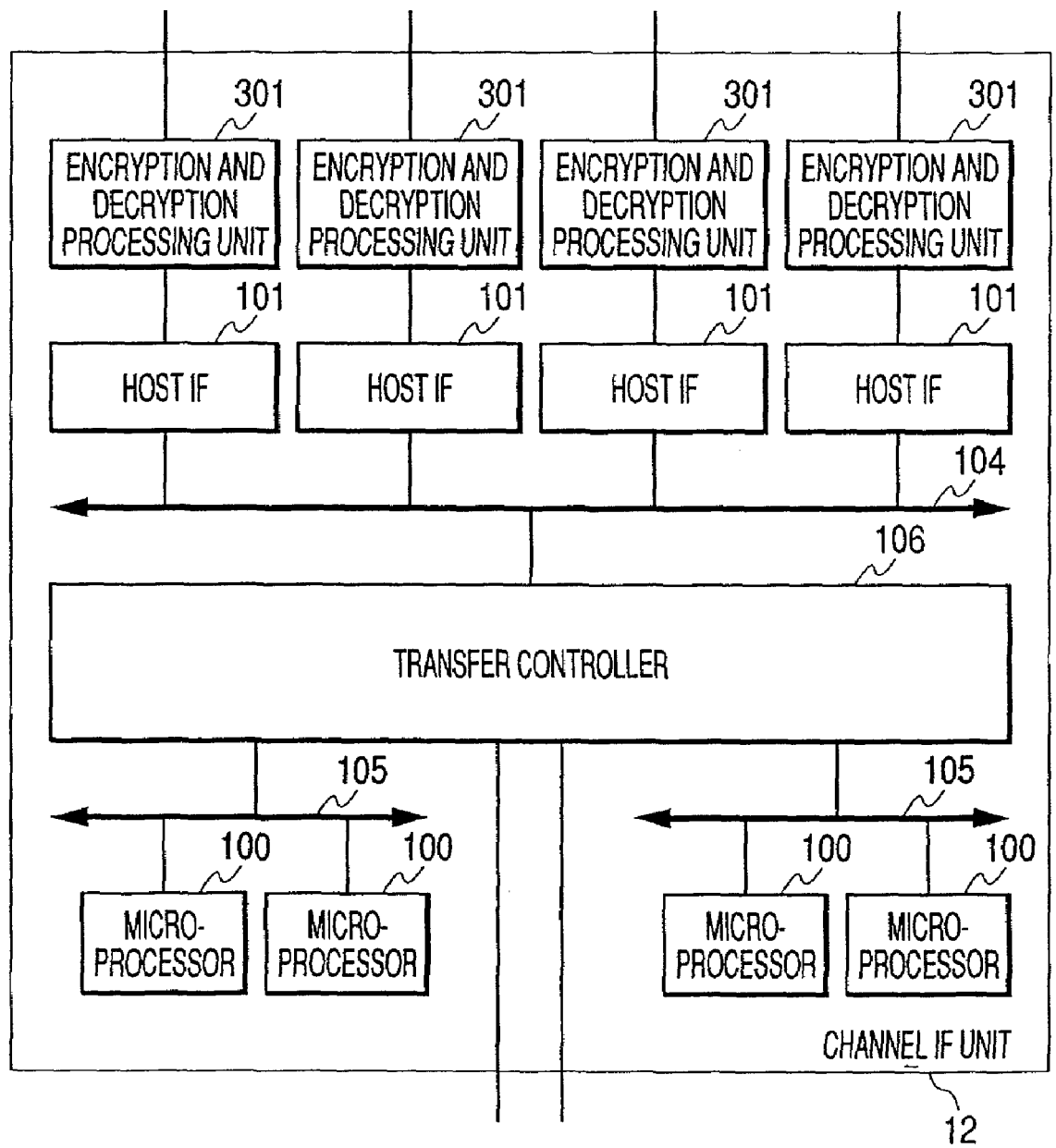
FIG. 19 is a block diagram illustrating the detailed configuration of a channel IF unit of a conventional storage system.

In the protocol of the storage system 1, the size of a data packet is in the range of several kilobytes to ten kilobytes, which is larger than the size (the average length: about 1 kB) of a data packet handled in the IP protocol. Therefore, providing the encryption and decryption processing unit 201 in the transfer controller 103 (that is, the encryption and decryption process after converting data into the protocol of the storage system 1) enables an improvement in the performance of the encryption and decryption process, compared to the case in which the encryption and decryption processing unit 201 is provided in the front stage (on the side of the server 3) of the host IF 101, as shown in FIG. 19 (that is, the encryption and decryption processing on the front stage of the IP protocol).

Next, the encryption and decryption process of data will be described in detail.

In the present embodiment, a stream cipher is used for the encryption and decryption of data.

Since the stream cipher generally has a higher degree of process efficiency than a block cipher, it is suitable for a system in which a large amount of data is transmitted, such as a storage system. In addition, when data having a non-uniform size is encrypted, a padding process (a process of adjusting the length of data by padding a predetermined value (for example, continuous zeros) when the data does not have a predetermined length) is not performed, whereby a surplus overhead is not needed.

When transmitting or receiving data using a cipher, prior to the start of communication, the exchange of information with a transmitting/receiving end is performed in advance to secretly share a cryptographic key. In the exchange, for example, an IKE (Internet Key Exchange: RFC2409) protocol and the like may be used. The cryptographic key is stored in the main memory of the microprocessor 100 in the channel IF unit 11 or in the control memory area of the memory unit 21. The storage system 1 performs an encryption and decryption process using the cryptographic key shared by the previous exchange.

In general, in the encryption and decryption of data, a secret parameter (hereinafter referred to as 'a secret key') and a public parameter (hereinafter referred to as 'an initial value') may be used as the cryptographic keys. In consideration of security, it is necessary to change the parameters each time the process is performed. However, since the increase of the cost of communication is considerable if a change of cryptographic key is performed everytime a packet process is executed, it is adequate that the cryptographic keys are fixed and only initial values are changed during a session in accordance with the present embodiment.

Sharing the initial value between transmitting and receiving ends can be executed by adding it to communication data (to transmitting/receiving end). For example, it is considered feasible to provide a counter in the encryption and decryption processing unit 201, which the counter increments whenever the encryption and decryption process is executed, so that the value of the counter is used as the initial value. The above technique is used in IPSec communication. In order to synchronize the counters between transmitting and receiving ends, the storage system 1 or the server 3 may communicate the value of the counter to the transmitting/receiving end as a sequence number of an ESP (Encapsulating Security Payload) header. However, since the sequence numbers of the ESP header are no more than 32 bits, it is necessary to appropriately change the secret key before the sequence numbers are repeated.

The encryption and decryption processing unit 201 has an encryption processing device 501 and a decryption processing device 701. The encryption processing device 501 is a device for encrypting data, and the decryption processing device 701 is a device for decrypting encrypted data. However, as another embodiment, one device may perform both the encryption and the decryption.

Figure 10:
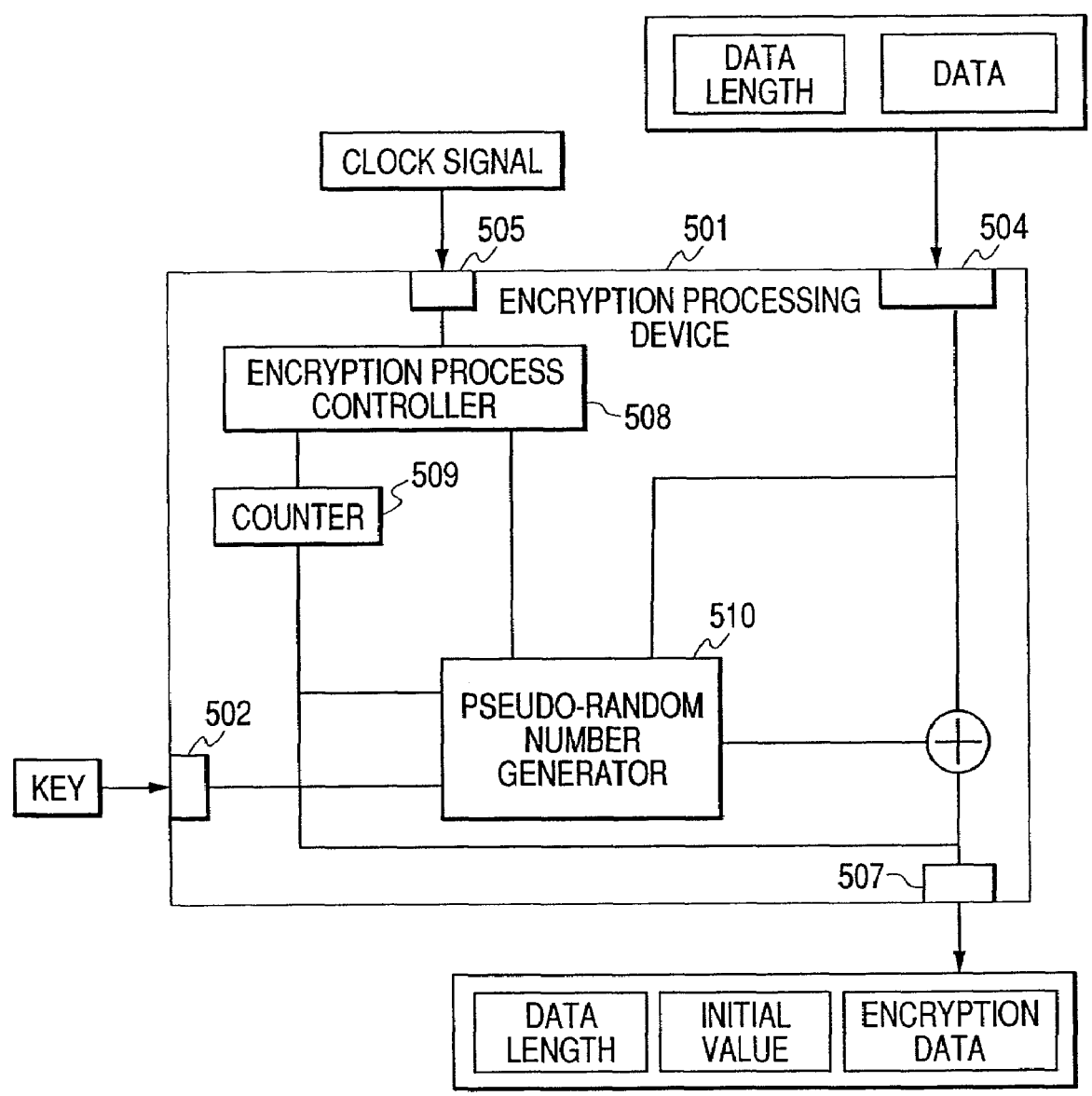
FIG. 10 is a diagram illustrating the configuration of an encryption processing device in an encryption and decryption processing unit.

FIG. 10 is a view illustrating the configuration of the encryption processing device 501. The encryption processing device 501 comprises an input unit for receiving various data, an output unit for outputting encrypted data, an encryption process controller 508 for controlling the operation of the encryption processing device 501, a counter 509, and a pseudo-random number generator 510. The input unit comprises an input unit 502 for receiving secret key data, an input unit 504 for receiving data to be encrypted, and an input unit 505 for receiving a clock signal. Herein, the encrypted data includes information related to the length of data. In addition, the output unit has an output unit 507 for outputting encrypted data (hereinafter, referred to as 'encryption data'). Herein, the encryption data includes the encrypted data, the initial value, and the information related to the length of data. These input and output units may be integrated into one unit.

The sequence of the encryption process will be described with reference to FIG. 10. When the input unit 504 receives the encrypted data, the encrypting processing device 501 encrypts the data according to the following steps and then outputs it.

Step 1: the encryption process controller 508, having detected the reception of data, transmits a signal to the counter 509 and the pseudo-random number generator 510 to start a process. When receiving the signal from the encryption process controller 508, the counter 509 inputs the value presently being held therein to the pseudo-random number generator 510 as an initial value, and then the value of the counter increments.

Step 2: when receiving the signal from the encryption process controller 508, the pseudo-random number generator 510 initializes its internal state using the initial value and information on the secret key input from the input unit 502.

Step 3: the pseudo-random number generator 510 generates a bit string having the same data length (or a length more than that) as the data input from the input unit 504.

Step 4: the encryption process device 501 calculates the bit string output from the pseudo-random number generator 510 and the received data using an exclusive-OR operation to create encryption data and then combines it with the initial value to output the combined value from the output unit 507.

In the above-mentioned steps, the pseudo-random number generator 510 generates a large integrated bit string and collectively performs an encryption process. This method can be used for a case in which a bit string for encryption is generated in advance if the load of the network is small.

Further, instead of collectively performing an exclusive-OR operation, the encryption processing device 501 may generate a small bit string having a predetermined length (for example, 64 bits) whenever receiving a clock signal, and then the bit string and a portion of the data string are calculated using an exclusive-OR operation. This method has merit in that the size of a memory required for the process of the exclusive-OR operation and the generation of a bit string is small, and the size of a circuit for mounting a hardware device is reduced. Further, this method can be applied to a real-time process since a process (the generation of a bit string) can start although the encryption processing device 501 knows the length of data to be received in advance.

Further, in the present embodiment, the counter 509 is used to generate the initial value. However, a random number generating device using physical characteristics may be used.

Figure 11:
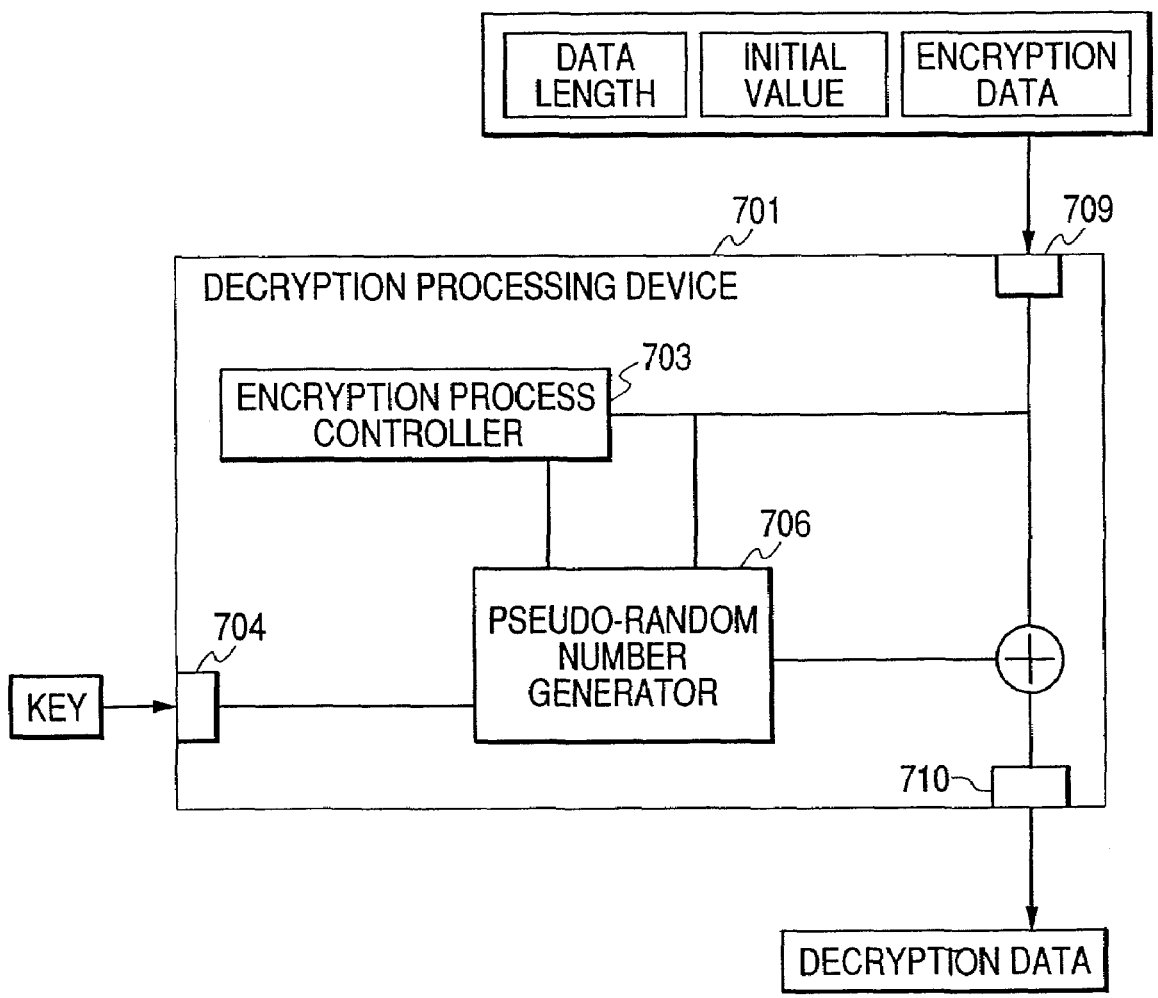
FIG. 11 is a diagram illustrating the configuration of a decryption processing device in the encryption and decryption processing unit.

Next, a decryption process will be described with reference to FIG. 11. The decryption process can be performed using a decryption processing device 701 having substantially the same configuration as the encryption processing device 501. The decryption processing device 701 comprises an input unit 702 for receiving encrypted data, an input unit 704 for receiving information on a secret key, an output unit 710 for outputting decrypted data, an encryption process controller 703 for controlling the operation of the decryption processing device 701, and a pseudo-random number generator 706. Herein, the encrypted data to be received includes an initial value, encrypted data, and information related to the length of data. Hereinafter, the sequence of the decryption process will be described:

Step 1: when receiving the packet of encryption data, the decryption processing device 701 initializes the internal state of the pseudo-random number generator 706 with the encryption process controller 703 using the initial value included in the received packet and the input secret key.

Step 2: the pseudo-random number generator 706 generates a bit string having the same length (or a length more than that) as the input data, based on information on the data length included in the encryption data.

Step 3: the decryption processing device 701 calculates the encryption data and the bit string output from the pseudo-random number generator 706 by an exclusive-OR operation to create decrypted data (hereinafter referred as to 'decryption data') and outputs it from the output unit 710.

Figure 20:
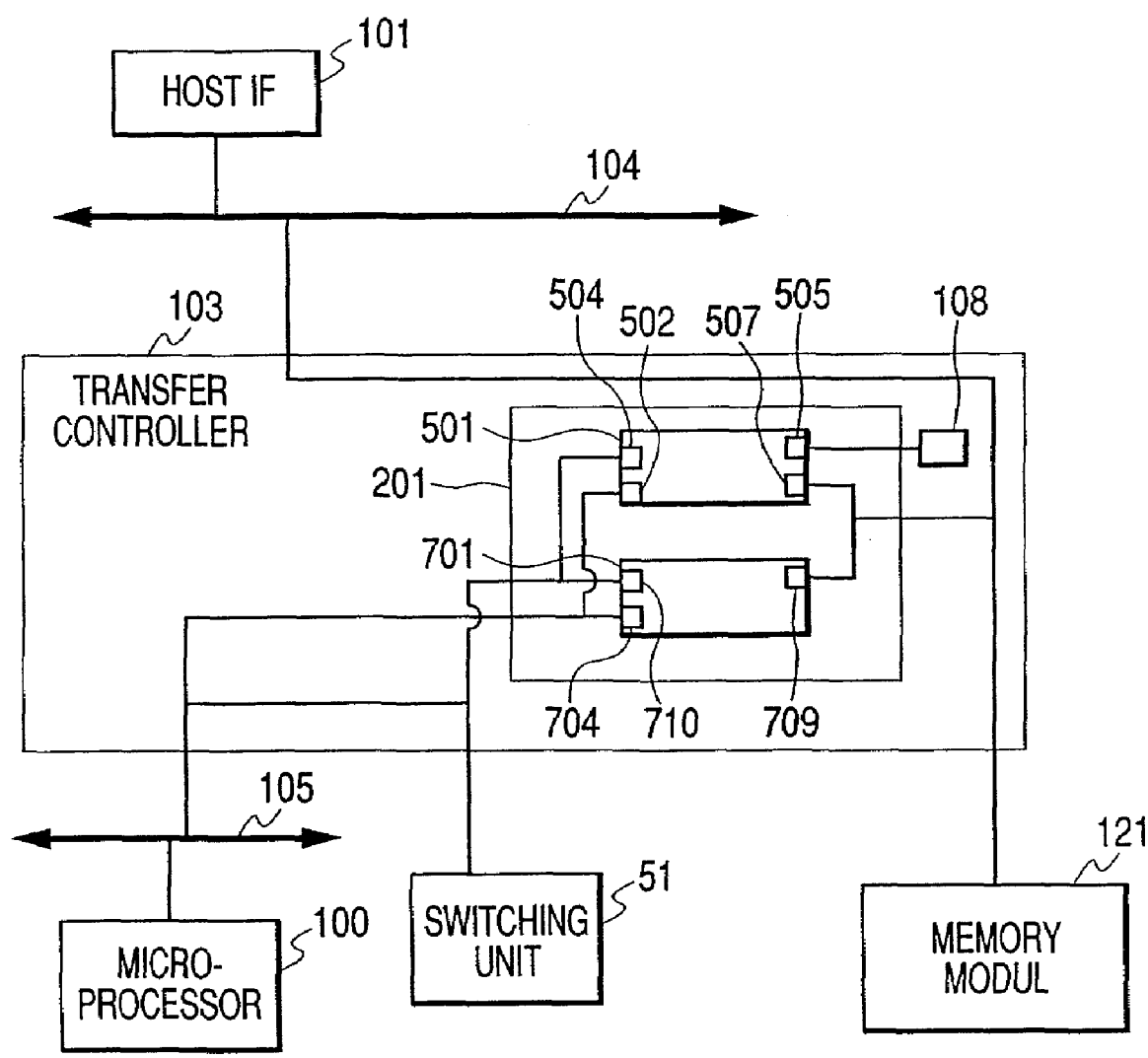
FIG. 20 is a diagram illustrating the configuration of the encryption and decryption processing unit.

FIG. 20 is a view illustrating the configuration of the encryption and decryption processing unit 201. The encryption and decryption processing unit 201 includes the encryption processing device 501 and the decryption processing device 701, and the input units and output units thereof have the following connection relationships with other members. The input unit 504 to which encrypted data (plaintext) is input and the output unit 710 from which decrypted data is output are connected to the switching unit 51. The output unit 507 from which the encrypted data is output and the input unit 709 to which the decrypted data is input are connected to the memory module 121 and the common bus 104. In addition, the input units 502 and 704, to which secret key data is input, are connected to the common bus 105 to enable input of the secret key from the microprocessor 100. Further, the input unit 505 to which the clock signal is input is connected to the clock generator 108 in the transfer controller 103. In encryption or decryption, the microprocessor 100 of the channel IF unit 11 transmits information on the secret key to the encryption and decryption processing unit 201 via the common bus 105 at the timing of data transmission.

Figure 14:
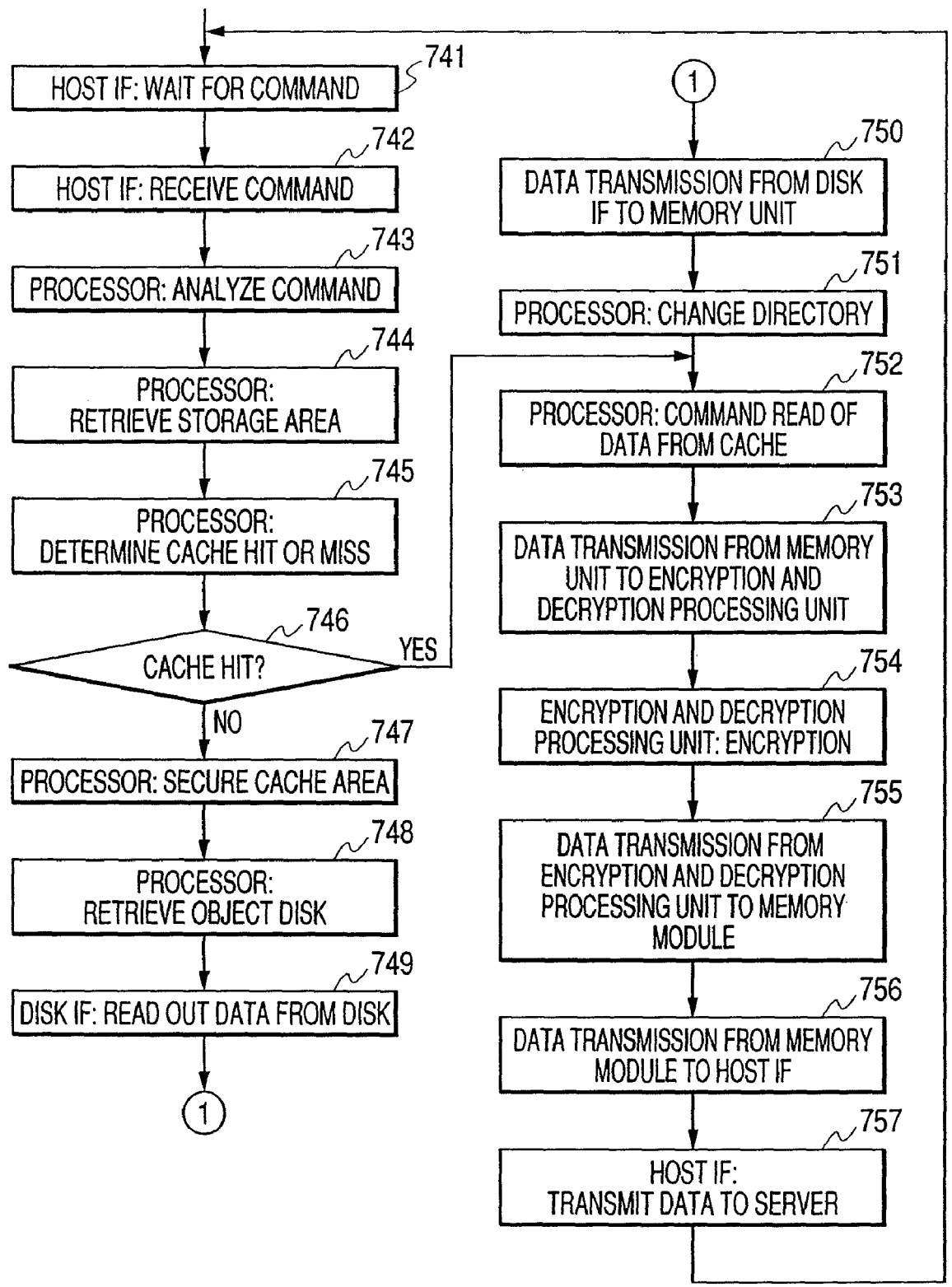
FIG. 14 is a flow chart illustrating a reading operation of the storage system.

FIG. 14 is a flow chart illustrating a process which is carried out when the server 3 reads out the data stored in the hard disk group 2 of the storage system 1.

First, the server 3 issues a command for reading data to the storage system 1 in the packet of IP. When the host IF 101 in the channel IF unit 11 receives the command (742), the host IF 101 in a command waiting state (741) writes the received command in the main memory of the microprocessor 100 in the channel IF unit 11 through the transfer controller 103.

The microprocessor 100 of the channel IF unit 11 reads out the corresponding command from the main memory to analyze it (743). The microprocessor 100 of the channel IF unit 11 retrieves information representing the storage area in which data required by server 3 is stored, based on the result of the command analysis (744).

The microprocessor 100 of the channel IF unit 11 confirms whether the data required for the command (hereinafter referred to as 'request data') is written in the cache memory area of the memory unit 21, based on information on the storage area obtained by the analysis of the command and the directory information of the cache memory stored in the control memory area of the memory unit 21 (745).

When the request data is present in the cache memory area (hereinafter referred to as 'a cache hit') (746), the microprocessor 100 of the channel IF unit 11 transmits, to the host IF 101 and the transfer controller 103, the information necessary for transmitting the request data to the host IF 101, specifically, information on the address in the memory module 127 in which the request data is stored and information on the address in the memory module 121 of the channel IF unit 11, which is a transmission destination.

Then, the microprocessor 100 of the channel IF unit 11 commands the host IF 101 to read out data from the memory unit 21 (752).

The host IF 101 of the channel IF unit 11 having received the command orders the transfer controller 103 to start transmitting data, based on the information necessary for transmitting the request data received from the microprocessor 100 of the channel IF unit 11. The transfer controller 103 accesses the memory controller 125 of the memory unit 21 to request the read of request data from the memory module 127, based on the necessary information received from the microprocessor 100. The memory controller 125, having received the request, reads the request data from the memory module 127 to transmit the request data to the transfer controller 103 of the channel IF unit 11 having received the request (753). The encryption and decryption processing unit 201 in the transfer controller 103 encrypts the data received from the memory unit 21 (754). Then, the transfer controller 103 writes the encryption data processed by the encryption and decryption processing unit 201 in the memory module 121 (755). Subsequently, the transfer controller 103 reads the encryption data from the memory module 121 to transmit it to the host IF 101 (756). The host IF 101, having received the request data, converts the request data into a data packet of the IP protocol and then transmits the converted data to the server 3 (757).

Meanwhile, when the request data is not present in the cache memory area (hereinafter referred to as 'a cache miss') (746), first, the microprocessor 100 of the channel IF unit 11 accesses the control memory area in the memory unit 21 and then registers, on the directory information of the cache memory area, information for securing an area in which the request data is to be stored in the cache memory area of the memory unit 21, specifically, information for specifying an empty cache slot (hereinafter referred to as 'securing a cache area') (747). After securing the cache area, the microprocessor 100 of the channel IF unit 11 accesses the control memory area in the memory unit 21 and then retrieves the disk IF unit 16 (hereinafter referred to as 'an object disk IF unit 16') connected to the hard disk group 2 in which the request data is stored, based on the management information of the storage area stored in the control memory area (748).

Thereafter, the microprocessor 100 of the channel IF unit 11 writes the request command for transmitting the request data from the disk IF 102 of the object disk IF unit 16 to the memory module 127 and necessary information in a predetermined place of the control memory area in the memory unit 21. The microprocessor 100 in the object disk IF unit 16 polls whether information is written in the predetermined place. Then, when information related to the microprocessor 100 itself is written therein, the microprocessor 100 reads out the information. The microprocessor 100 in the object disk IF unit 16 analyzes the information and then transmits, to the disk IF 102 and the transfer controller 106, the control information representing the data being transmitted from one of the disk IFs 102 to one of the memory units 21 and parameters required for the data transmission. Then, the microprocessor 100 of the object disk IF unit 16 commands the disk IF 102 of the object disk IF unit 16 to read the request data from the hard disk group 2 and then to write the request data in the memory unit 21.

The disk IF 102 of the object disk IF unit 16, having received the command, reads the request data from the hard disk group 2 according to the command, based on the information necessary for transmitting the request data (749) and then commands the transfer controller 106 to start transmitting data. The disk IF 102 transmits the data to the transfer controller 106. Then, the transfer controller 106 outputs a write request of data to the memory unit 21 and transmits the received data to the memory unit 21 in a predetermined packet, based on the necessary information received from the microprocessor 100. The memory controller 125 writes the received request data in the memory module 127 (750). When the writing of the request data is completed, the memory controller 125 communicates the completion of the write operation to the microprocessor 100 of the object disk IF unit 16.

The microprocessor 100 of the object disk IF unit 16, having detected the completion of the writing of data in the memory module 127, accesses the control memory area of the memory unit 21 to change the directory information of the cache memory area. More specifically, the microprocessor 100 of the object disk IF unit 16 registers the change of the contents in the cache memory area on the directory information (751). Further, the microprocessor 100 of the object disk IF unit 16 writes, in a predetermined place of the control memory area in the memory unit 21, a command for the channel IF unit 11, which has received the request command for reading data, to read the request data from the memory unit 21. The microprocessor 100 of the channel IF unit 11 polls whether information is written in the predetermined place. Then, when the information related to the microprocessor 100 itself is written therein, the microprocessor 100 reads the information and then follows the commands of the disk IF unit 16.

The channel IF unit 11, having received the command, reads the request data from the memory module 127 to transmit it to server 3, similar to the process sequence at the time of a cache hit. As described above, the storage system 1 reads data from the cache memory or the hard disk group 2 to transmit it to server 3 when the server 3 requests the reading of data.

Figure 15:
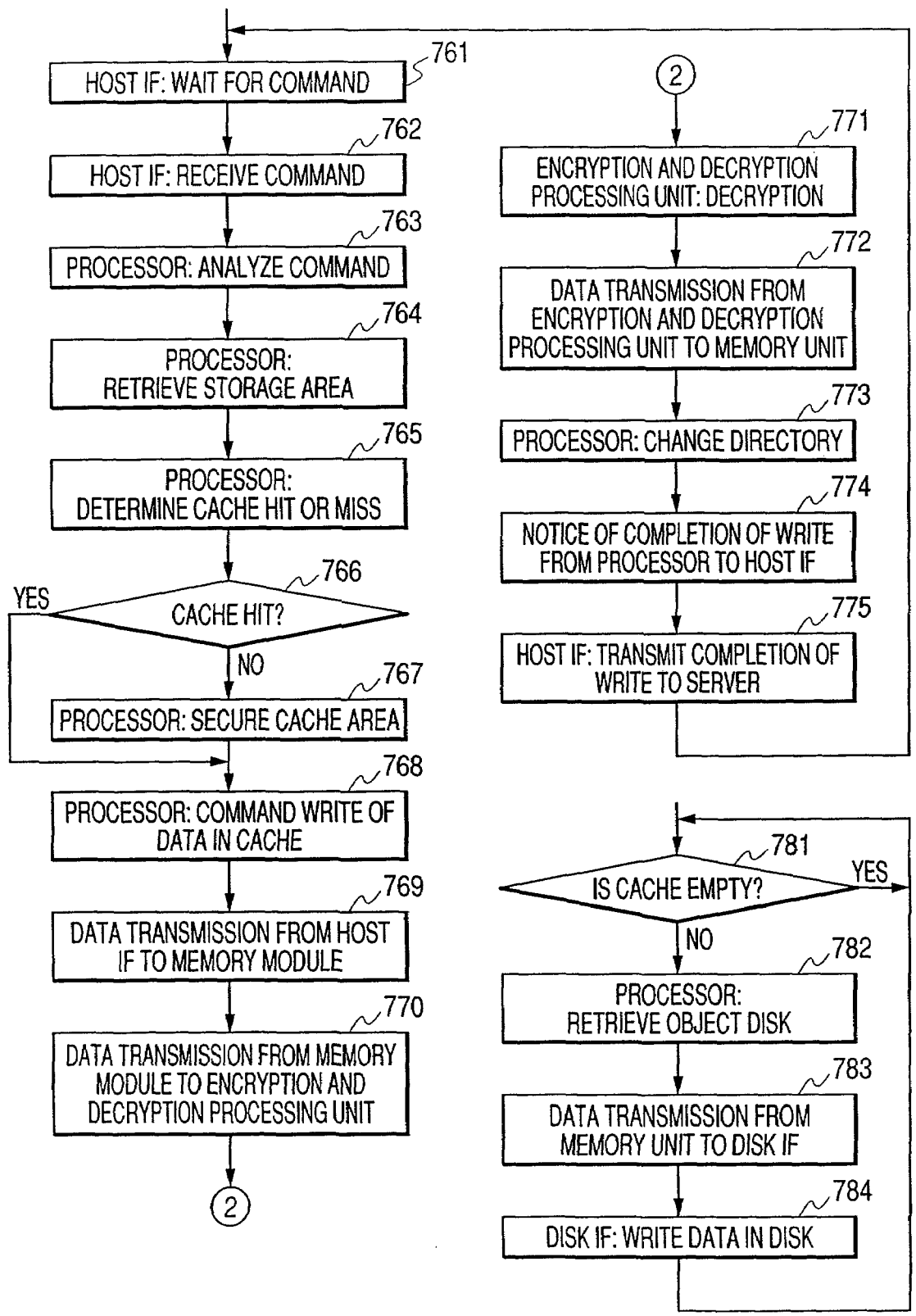
FIG. 15 is a flow chart illustrating a writing operation of the storage system.

Next, a process sequence that is carried out when data is written from the server 3 to the storage system 1 will be described. FIG. 15 is a flow chart illustrating the process sequence that occurs when data is written from the server 3 to the storage system 1.

First, the server 3 issues a command for writing data to the storage system 1. Further, in the present embodiment, it is assumed that the write command includes data to be written (hereinafter referred to as 'update data'). However, the write command does not necessarily include the update data. In this case, after confirming the state of the storage system 1 by the write command, the server 3 will transmit the update data.

When the host IF 101 in the channel IF unit 11 receives the command (762), the host IF 101 in the command waiting state (761) transmits the received command to the main memory of the microprocessor 100 in the channel IF unit 11.

The microprocessor 100 of the channel IF unit 11 reads out the corresponding command from the main memory and then analyzes the command (763). The microprocessor 100 of the channel IF unit 11 retrieves the information representing the storage area in which the update data to be written by the request of the server 3 is written (764), based on the result obtained by analyzing the command. The microprocessor 100 of the channel IF unit 11 determines whether the object of the write request, that is, the data to be updated (hereinafter referred to as 'update object data') is written in the cache memory area of the memory unit 21, based on the information indicating the storage area in which the update data is written and the directory information of the cache memory area stored in the control memory area of the memory unit 21 (765).

When the update object data is present in the cache memory area (hereinafter referred to as 'a write hit') (766), the microprocessor 100 of the channel IF unit 11 transmits the information necessary for transmitting the update data from the host IF 101 to the memory module 127 to the host IF 101 and the transfer controller 103. Then, the microprocessor 100 of the channel IF unit 11 commands the host IF 101 to write the update data transmitted from the server 3 in the memory module 127 of the memory unit 21 (768).

The host IF 101, having received the command, orders the transfer controller 103 to start transmitting data. The host IF 101 transmits the update data to the memory module 121 through the transfer controller 103, based on the information necessary for transmitting the update data (769). Subsequently, the encryption and decryption processing unit 201 of the transfer controller 103 receives the update data from the memory module 121 (770) and then decrypts the data (771). Then, the transfer controller 103 will output the write request of data to the memory unit 21 according to the above-mentioned necessary information received from the microprocessor 100 and transmits the decryption data (the update data) decrypted by the encryption and decryption processing unit 201 to the memory unit 21 in a predetermined packet. The memory controller 125, having received the update data overwrites the update object data stored in the memory module 127, as the update data (772).

After the completion of a write operation, the memory controller 125 notifies the microprocessor 100 of the channel IF unit 11 having transmitted the command that the writing of the update data has been completed.

The microprocessor 100 of the channel IF unit 11, having detected that the write of the update data in the memory module 127 is completed, accesses the control memory area of the memory unit 21 to update the directory information of the cache memory area. More specifically, the microprocessor 100 of the channel IF unit 11 registers the updated contents of the cache memory area on the directory information (773). At the same time, the microprocessor 100 of the channel IF unit 11 commands the host IF 101 having received the write request from the server 3 to transmit a notification of the completion of writing to the server 3 (774). The host IF 101, having received the command, transmits the notification of the completion of writing to the server 3 (775).

When the update object data is not present in the memory module 127 (hereinafter referred to as 'a write miss') (766), the microprocessor 100 of the channel IF unit 11 accesses the memory module 127 of the memory unit 21 and registers, on the directory information of the cache memory area, the information for securing an area for storing the update data in the cache memory area of the memory unit 21, specifically, the information for specifying an empty cache slot ('securing the cache area') (767). After securing the cache area, the storage system 1 performs the same control as that in the case of a write hit. However, since the update object data is not present in the memory module 127 in the case of the write miss, the memory controller 125 stores the update data in the storage area secured as a place for storing the update data.

Then, the microprocessor 100 of the channel IF unit 11 (or the disk IF unit 16) checks how much unused capacity is in the cache memory (781) and writes the update data written in the cache memory area of the memory unit 21 in the hard disk group 2 asynchronously with the write request from the server 3. More specifically, the microprocessor 100 of the channel IF unit 11 (or the disk IF unit 16) accesses the control memory area of the memory unit 21 and retrieves the disk IF unit 16 (hereinafter referred to as 'an update object disk IF unit 16') to which the hard disk group 2 for storing the update data is connected, based on the management information of the storage area (782). Then, the microprocessor 100 of the channel IF unit 11 (or the disk IF unit 16) transmits the information necessary for transmitting the update data to the transfer controller 106 and the disk IF 102 in the update object disk IF unit 16.

Subsequently, the microprocessor 100 of the channel IF unit 11 (or the disk IF unit 16) commands the microprocessor 100 of the update object disk IF unit 16 to read out the update data from the memory module 127 and to transmit the read data to the disk IF 102 of the update object disk IF unit 16. The disk IF 102 of the update object disk IF unit 16, having received the command, orders the transfer controller 106 to start transmitting data, based on the information necessary for transmitting the update data. The transfer controller 106 outputs the read request of data to the memory unit 21 according to the information received from the microprocessor 100 and receives the read data from the memory unit 21 to transmit the received data to the disk IF 102 in a predetermined packet (783). The disk IF 102, having received the update data, writes the update data in the hard disk group 2 (784). As described above, when the server 3 requests the writing of data, the storage system 1 writes data in the memory module 127 and the hard disk group 2.

Figure 4:
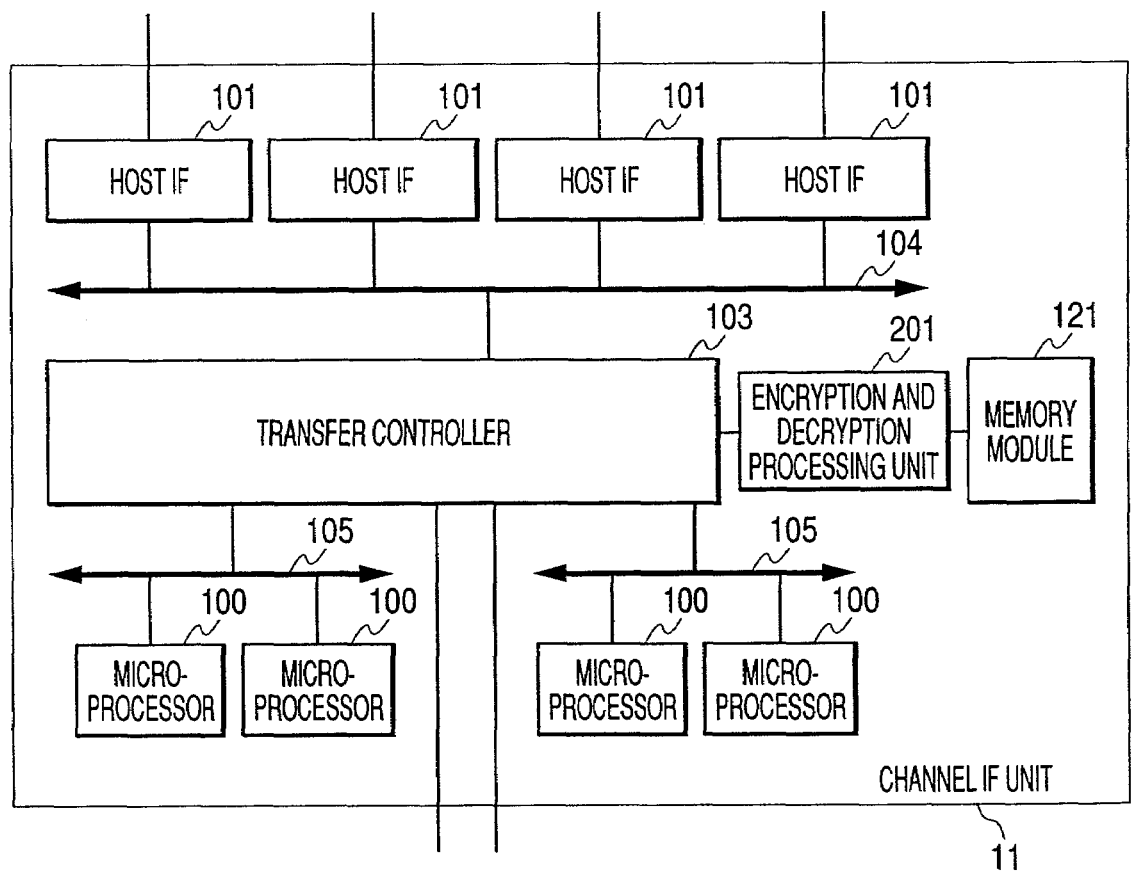
FIG. 4 is a block diagram illustrating another configuration of the channel IF unit.

FIG. 4 is a view illustrating another configuration of the channel IF unit 11. The configuration of the channel IF unit 11 shown in FIG. 4 is the same as that shown in FIG. 3 except for the position of the encryption and decryption processing unit 201. In this configuration, the encryption and decryption processing unit 201 is arranged between the memory module 121 and the transfer controller 103, separately from the transfer controller 103. When the encryption and decryption processing unit is not needed, the configuration in which the encryption and decryption processing unit is separately arranged enables the encryption and decryption processing function to be physically unavailable merely by removing that component. However, in this configuration, it is not necessary to change the above-mentioned process sequence.

Figure 5:
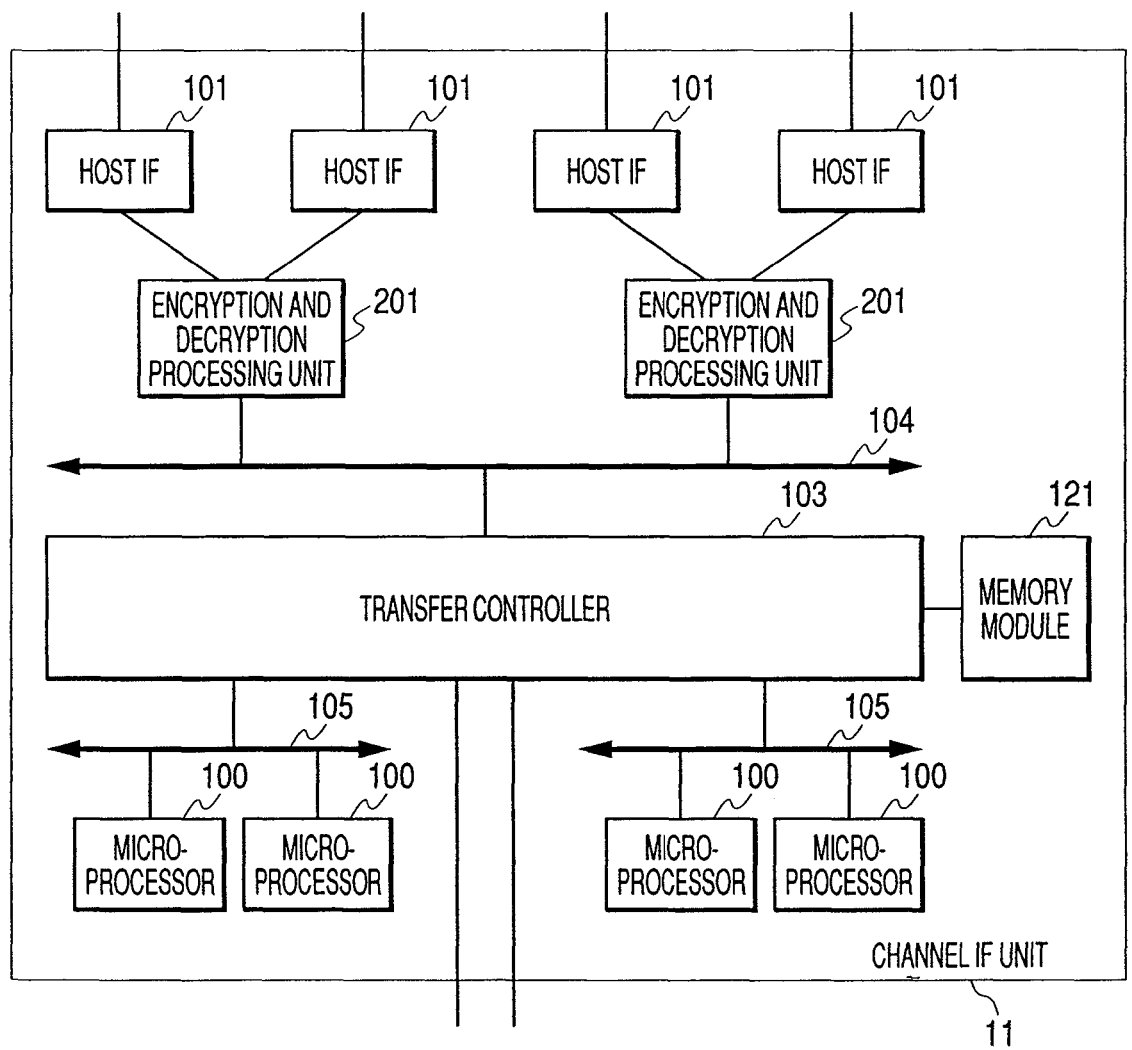
FIG. 5 is a block diagram illustrating still another configuration of the channel IF unit.

FIG. 5 is a view illustrating still another configuration of the channel IF unit 11. The configuration of the channel IF unit 11 shown in FIG. 5 is the same as that shown in FIG. 3 except for the position of the encryption and decryption processing unit 201. In this configuration, the encryption and decryption processing unit 201 is arranged between the host IF 101 and the common bus 104. In addition, one encryption and decryption processing unit 201 encrypts data to be output to (or to be input from) two host IFs. When the encryption and decryption processing unit is not needed, the configuration enables the encryption and decryption processing function to be physically unavailable merely by removing that component. However, in this configuration, the encryption of data is performed in the course of transmitting the data read from the memory module 121 to the host IF 101. In addition, the decryption of the encryption data is performed in the course of transmitting data from the host IF 101 to the transfer controller 103.

Figure 6:
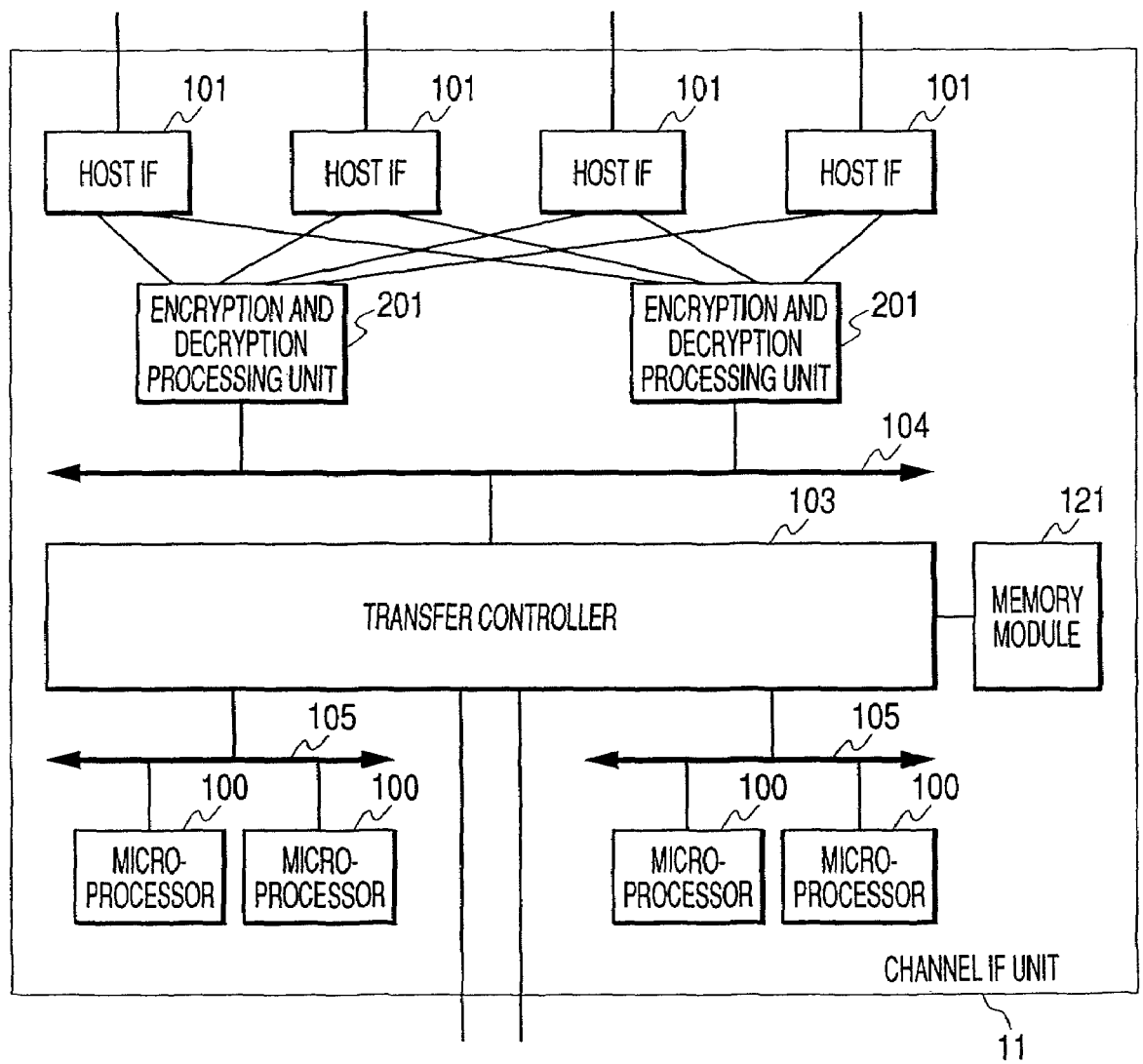
FIG. 6 is a block diagram illustrating yet another configuration of the channel IF unit.

FIG. 6 is a view illustrating yet another configuration of the channel IF unit 11. The configuration of the channel IF unit 11 shown in FIG. 6 is the same as that shown in FIG. 5 except for the fact that each host IF 101 is connected to two encryption and decryption processing units 201. According to this configuration, even when a failure occurs in one of the encryption and decryption processing units 201, it is possible for the other encryption and decryption processing unit 201 to continuously encrypt data, thereby improving the reliability of the storage system 1. In addition, when the encryption and decryption processing units are not needed, it is possible to make the encryption and decryption processing function physically unavailable merely by removing those components.

Figure 7:
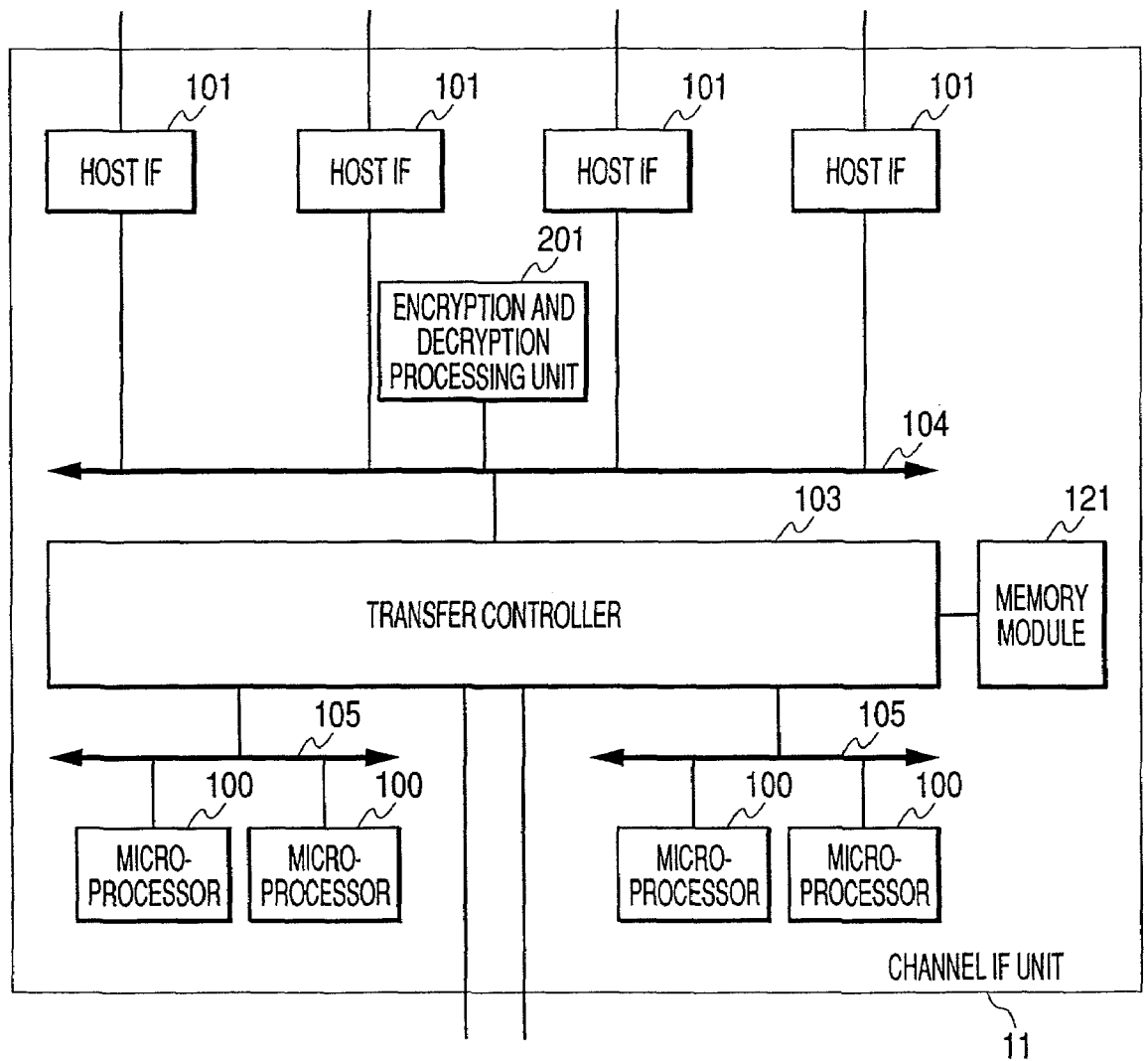
FIG. 7 is a block diagram illustrating yet another configuration of the channel IF unit.

FIG. 7 is a view illustrating still another configuration of the channel IF unit 11. The configuration of the channel IF unit 11 shown in FIG. 7 is the same as that shown in FIG. 5 except for the position of the encryption and decryption processing unit 201. In this configuration, the encryption and decryption processing unit 201 is connected to the common bus 104 like the host IFs 101. Also, when the encryption and decryption processing unit is not needed, the configuration enables the encryption and decryption processing function to be physically unavailable merely by removing that component. Further, in this configuration, the encryption of data is performed in the course of transmitting the data read from the memory module 121 to the host IF 101. In addition, the decryption of the encryption data is performed in the course of transmitting data from the host IF 101 to the transfer controller 103.

Figure 8:
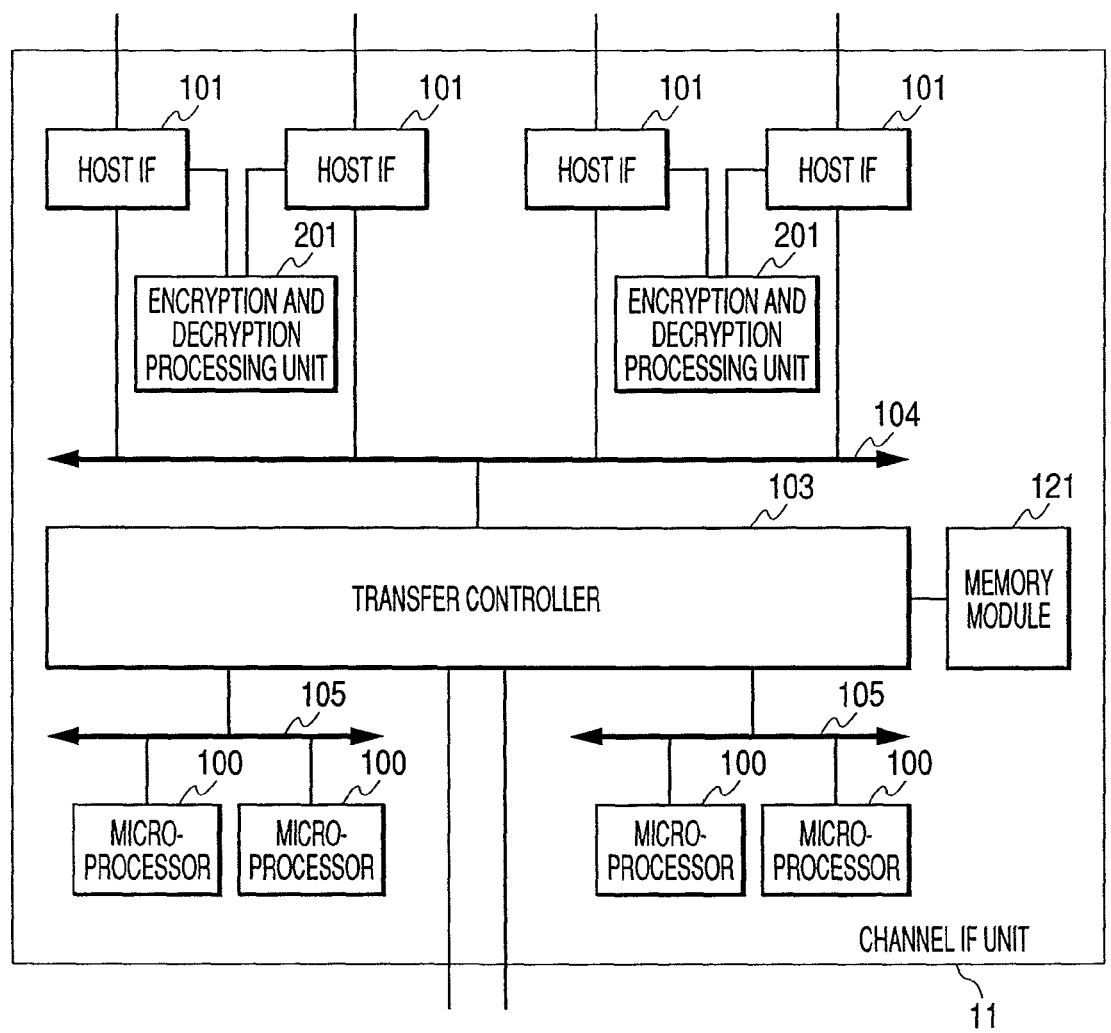
FIG. 8 is a block diagram illustrating another configuration of the channel IF unit.

FIG. 8 is a view illustrating another configuration of the channel IF unit 11. The configuration of the channel IF unit 11 shown in FIG. 8 is the same as that shown in FIG. 5 except for the position of the encryption and decryption processing unit 201. In this configuration, each encryption and decryption processing unit 201 is connected to two host IFs 101. Also, when the encryption and decryption processing unit is not needed, the configuration enables the encryption and decryption processing function to be physically unavailable merely by removing that component. Further, in this configuration, the encryption of data is performed before data is converted into a data packet for the IP protocol in the host IF 101. In addition, the decryption of the encryption data is performed after data is converted from the data packet for the IP protocol into a data packet for the data transmission protocol of the storage system in the host IF 101.

Figure 9:
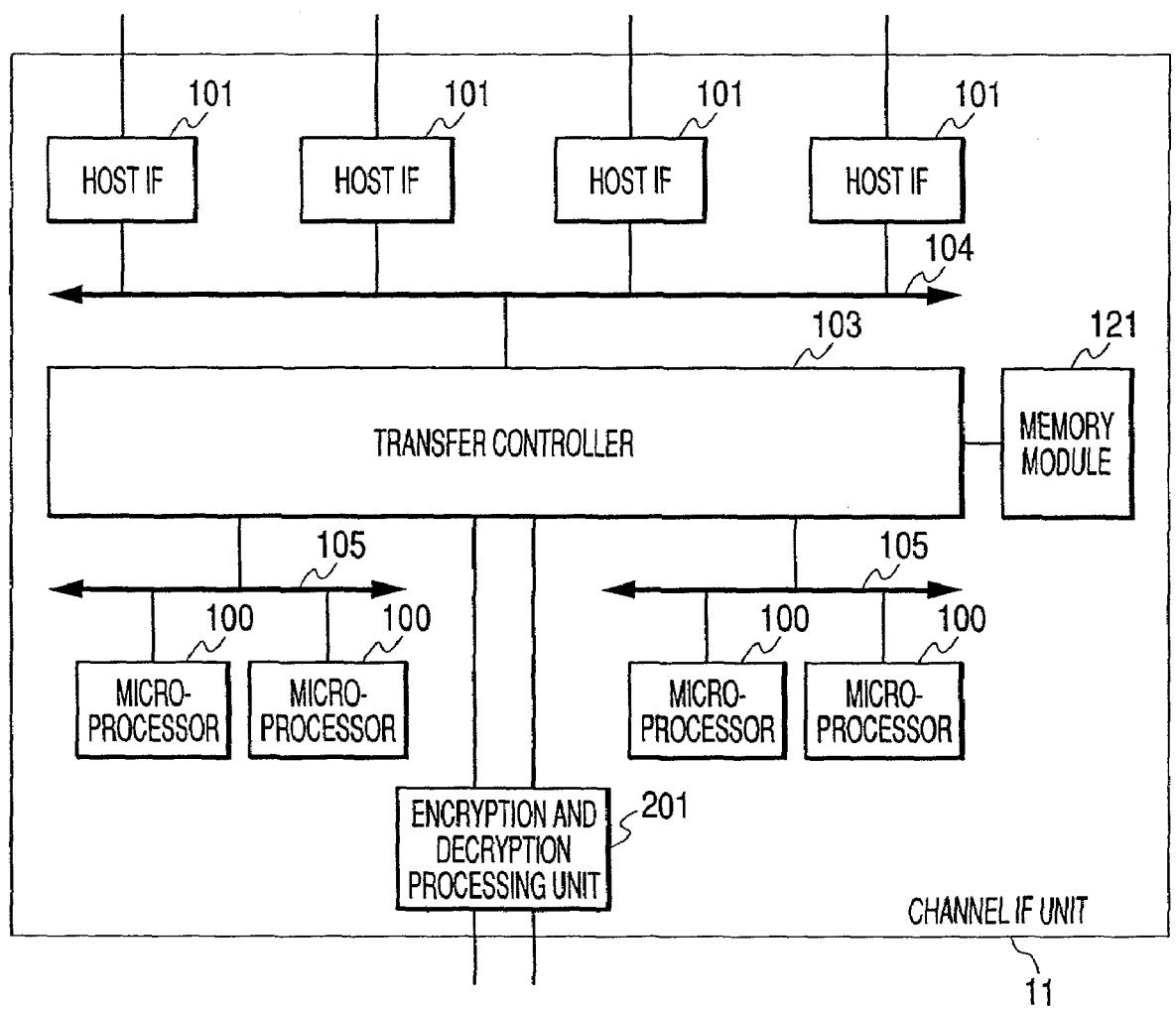
FIG. 9 is a block diagram illustrating another configuration of the channel IF unit.

FIG. 9 is a view illustrating yet another configuration of the channel IF unit 11. The configuration of the channel IF unit 11 shown in FIG. 9 is the same as that shown in FIG. 3 except for the position of the encryption and decryption processing unit 201. In this configuration, the encryption and decryption processing unit 201 is connected to the path connected to the switching unit 51. Also, when the encryption and decryption processing unit is not needed, the configuration enables the encryption and decryption processing function to be physically unavailable merely by removing that component.

Figure 21:
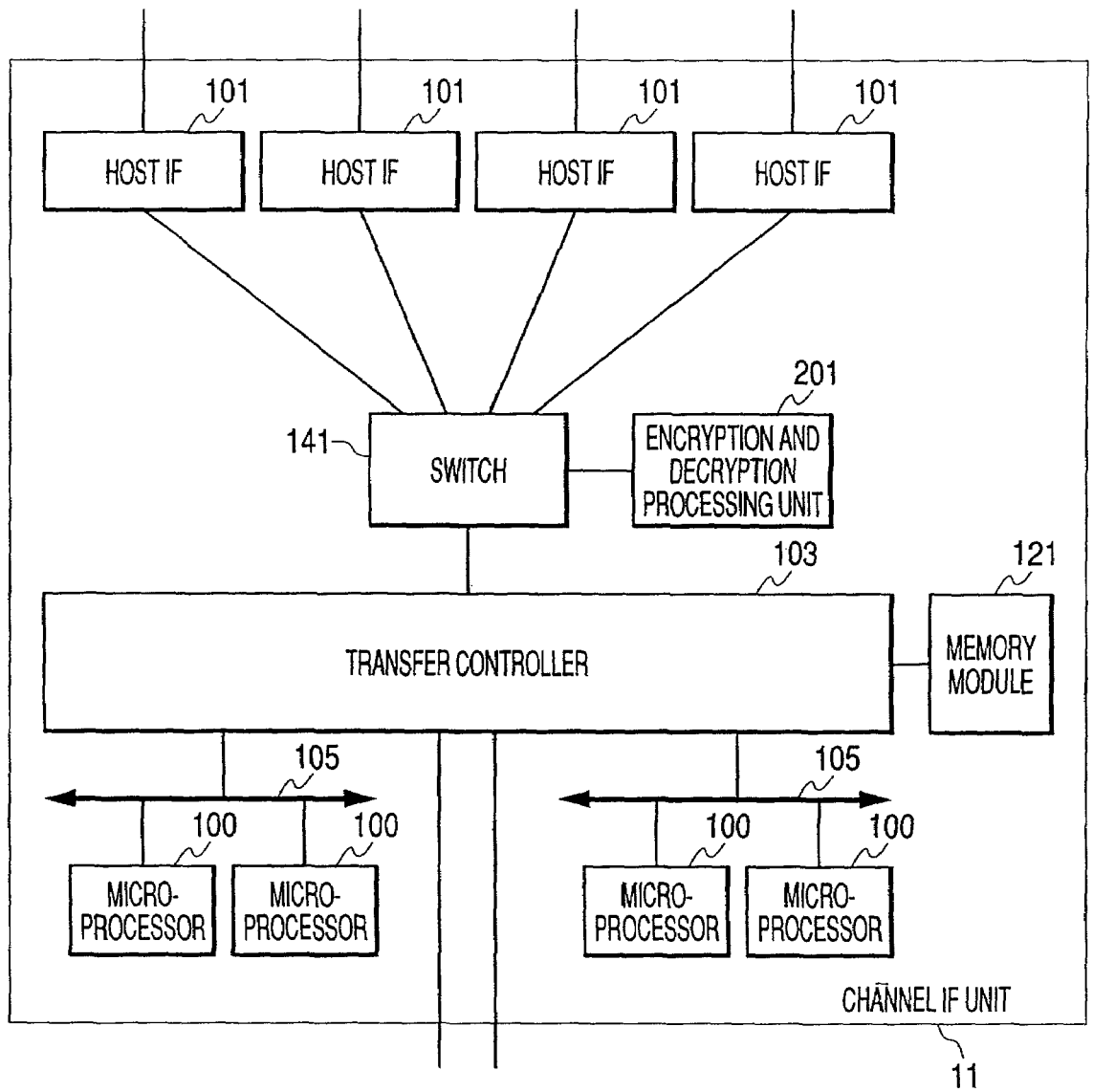
FIG. 21 is a block diagram illustrating another configuration of the channel IF unit.

FIG. 21 is a view illustrating still another configuration of the channel IF unit 11. The configuration of the channel IF unit 11 shown in FIG. 21 is the same as that in FIG. 7 except for the fact that the host IFs 101 are connected to the transfer controller 103 via a switch 141 and that the encryption and decryption processing unit 201 is directly connected to the switch 141. In this configuration, at the time of reading data, data is read out from the memory module 121 and is then transmitted to the encryption and decryption processing unit 201 via the switch 141 for data encryption. Then, the encryption data is transmitted to the host IF 101 via the switch 141 again. On the other side, at the time of writing data, the encryption data is transmitted from the host IF 101 to the encryption and decryption processing unit 201 via the switch 141 for data decryption, and then the decrypted data is transmitted to the transfer controller 103 via the switch 141. Also, when the encryption and decryption processing unit is not needed, the configuration enables the encryption and decryption processing function to be physically unavailable by removing that component.

As described above, the encryption and decryption process can also be performed by the configurations of the channel IF units 11 shown in FIGS. 4 to 9 and 21. In addition, the read/write sequences of data in the configurations shown in FIGS. 4 to 9 and 21 are equal to each other, while the places where the encryption process and the decryption process are performed are different from each other, as described with reference to FIGS. 4 to 9 and 21 in connection with the flow charts shown in FIGS. 14 and 15.

According to the present embodiment, it is possible to provide a storage system capable of performing efficient and high-function encryption and decryption.

Figure 18:
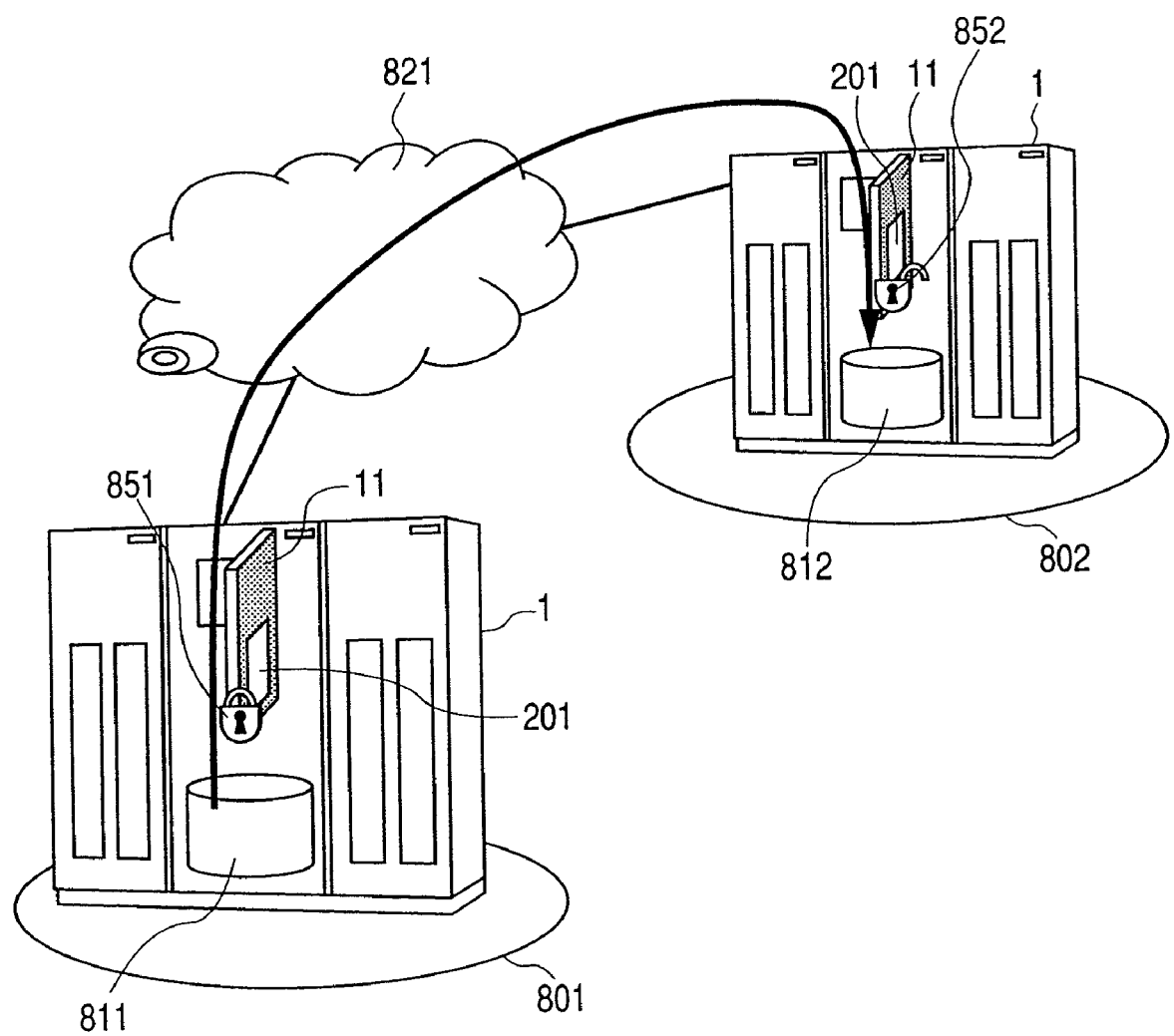
FIG. 18 is a block diagram illustrating an example of the data copy operation carried out between two storage systems.

FIG. 18 shows an example of the remote copying of data between the storage systems 1 according to the present embodiment.

The channel IF unit 11 of the storage system 1 in a main site 801 is connected to the channel IF unit 11 of the storage system 1 in a remote site 802 through a wide area network 821. At the time of the remote copying of data, a system administrator previously specifies a storage area (hereinafter referred to as a 'volume'), which is an object of the remote copy of data from the management terminal 8, and whether to perform the encrypted communication between the main site and the remote site, with respect to the storage system 1 in the main site. Further, the administrator mainly determines a standard for setting the encrypted communication. The standard is, for example, whether the remote copy relates to a volume in which important data is stored.

Therefore, in an actual process of remote copy, first, the storage system 1 in the main site transmits all data in the volume, which is an object of the remote copy, to the remote site (referred to as 'an initial copy'). Then, when the data in the object volume of the remote copy is updated, the update data is transmitted to the remote site. At that time, in the case in which an encrypted communication is specified, in the storage system 1 in the main site, the microprocessor 100 of the channel IF unit 11 performing the remote copy raises a bit of a register for allowing the process of the encryption and decryption processing unit 201 in the transfer controller 103 to be available, so that the encryption and decryption processing unit 201 is set so as to encrypt or decrypt data. In this way, data is read out and is then encrypted in the above-mentioned sequence. Then, the encrypted data is transmitted to the other storage systems 1. Further, the other storage system 1 receives data and decrypts the data according to the above-mentioned sequence. Then, the decrypted data is stored.

According to the storage system performing the above-mentioned encryption and decryption processes, at the time of the remote copy of data between two places separated from each other, it is possible to copy the encrypted data at high speed.

Figure 12:
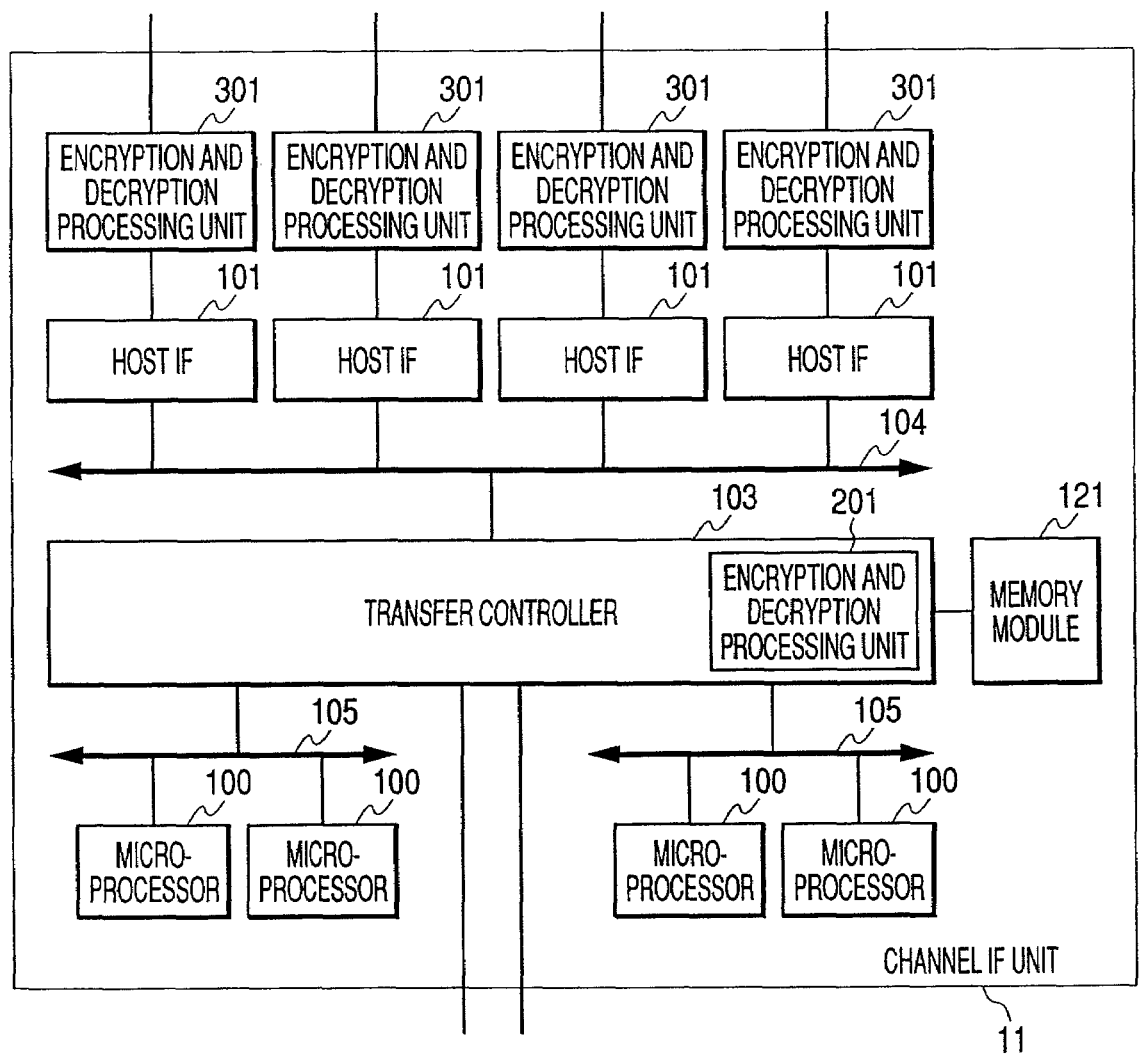
FIG. 12 is a block diagram illustrating yet another configuration of the channel IF unit.
Figure 13:
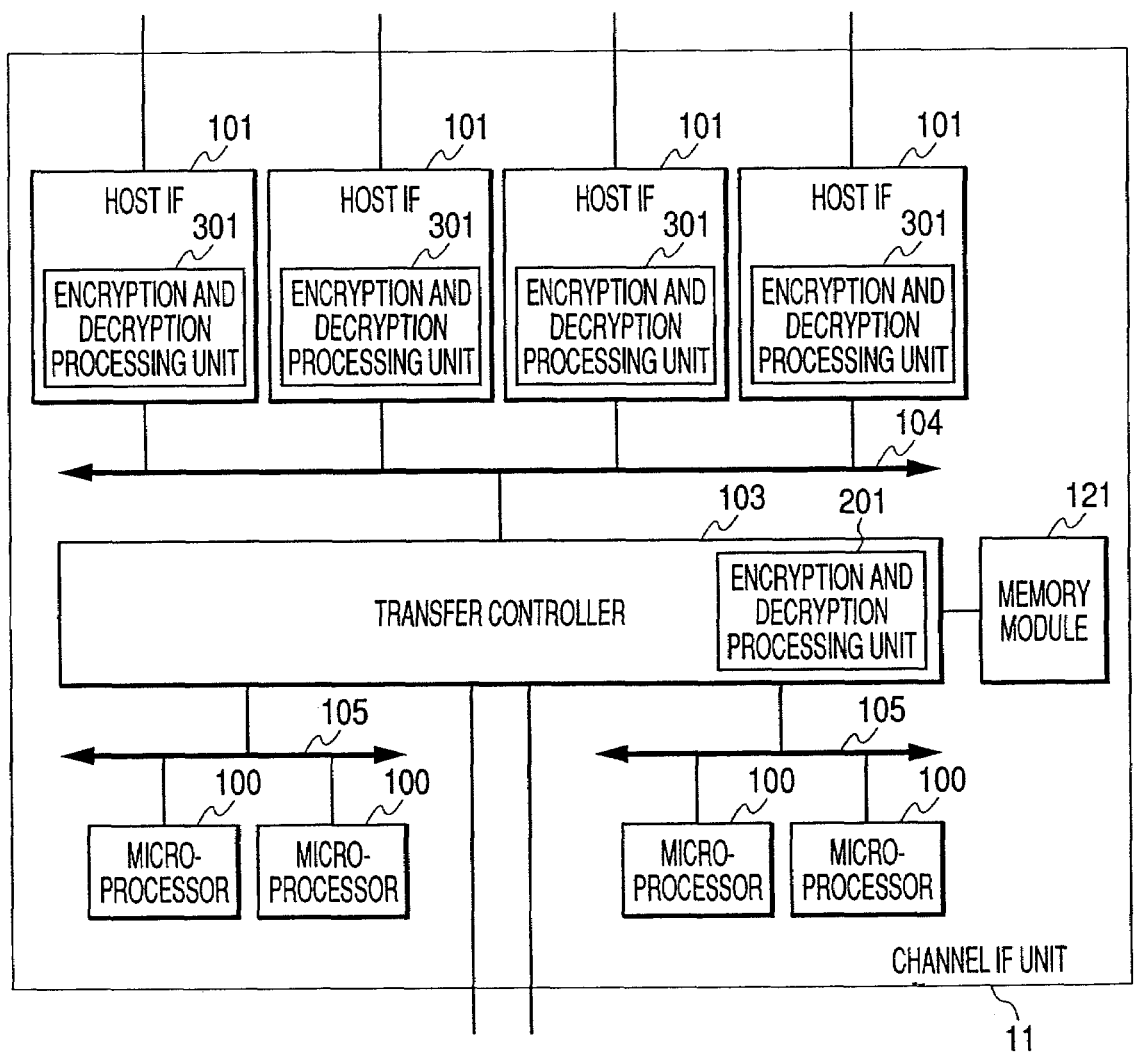
FIG. 13 is a block diagram illustrating still another configuration of the channel IF unit.

FIGS. 12 and 13 are views illustrating the configurations of a channel IF unit 11 according to a second embodiment, respectively.

The configurations of the storage systems 1 shown in FIGS. 12 and 13 are the same as that shown in FIG. 1, except for the configuration of the channel IF unit 11. The configuration of the channel IF unit 11 according to the present embodiment is the same as that shown in FIG. 3, except that two encryption and decryption processing units are provided.

In the storage system 1 according to the present embodiment, similar to FIG. 3, the encryption and decryption processing unit 201 is provided in the transfer controller 103 (or the above-mentioned place), and an encryption and decryption processing unit 301 is provided in the front stage of the host IF 101 (the connecting portion between the host IF 101 and the IP network).

In the present embodiment, a high-speed cipher algorithm, for example, a stream cipher is used for a cipher algorithm of the encryption and decryption processing unit 201, and a block cipher used for an IPsec protocol is used for a cipher algorithm of the encryption and decryption processing unit 301.

The reason why the stream cipher is used for the cipher algorithm of the encryption and decryption processing unit 201 is that, since the size of a data packet in the protocol of the storage system 1 is in the range of several kilobytes to ten kilobytes, which is larger than the size (the average length: about 1 kB) of a data packet used in the IP protocol, it is possible to improve the efficiency of the encryption and decryption processes by providing the encryption and decryption processing unit 201 in the transfer controller 103, compared to the case in which the encryption and decryption processing unit 201 is provided in the front stage of the host IF 101, as shown in FIG. 19.

The reason why the block cipher is used for the cipher algorithm of the encryption and decryption processing unit 301 is that an LSI for an IPsec process is generally provided in the front stage of the host IF 101, or is provided in the host IF 101 to convert data into a data packet of the IP protocol, and then the encryption process is performed by the IPsec protocol.

Therefore, by combining these two encryption and decryption processing units, it is possible to properly use the advantages of both components. An example of the proper use thereof will be described below.

FIG. 13 is a view illustrating another configuration of a case in which the channel IF unit 11 has two encryption and decryption processing units. The configuration of the channel IF unit 11 shown in FIG. 13 is the same as that of the channel IF unit 11 shown in FIG. 12, except that the encryption and decryption processing unit 301 is provided in the host IF 101.

In the configurations shown in FIGS. 12 and 13, the microprocessor 100 of the channel IF unit 11 selects one of the encryption and decryption processing units 201 and 301 to perform the encryption and decryption processes according the conditions previously determined in the management terminal 8 by the administrator and commands the selected one of the encryption and decryption processing units 201 and 301 to perform these processes. Herein, the conditions previously determined in the management terminal 8 are stored in the control memory area of the memory unit 21, for example, as a table in the form of the usage conditions of the encryption and decryption processing unit 201 and the usage conditions of the encryption and decryption processing unit 301.

When the system is initialized or when a command is received from the management terminal 8, the microprocessor 100 in each channel IF unit 11 writes the conditions necessary for the encryption (decryption) process in the registers of the encryption and decryption processing units 201 and 301 with reference to the table stored in the control memory area. When data is input, each of the encryption and decryption processing units 201 and 301 determines whether to perform the encryption (decryption) process, based on the conditions written in the register and the header information in the data packet. When the encryption process is performed, each of the encryption and decryption processing units 201 and 301 executes the encryption process, but, when the encryption process is not performed, it passes data without executing the encryption process.

Further, whenever receiving a predetermined data packet, the microprocessor 100 determines whether to perform the encryption process without writing the conditions in the register, based on the condition table stored in the control memory area of the memory unit 21 and the header information in the received data packet, and then it commands each of the encryption and decryption processing units 201 and 301 to perform the encryption process.

For example, the following conditions are considered as an example of the above-mentioned conditions.

Determination conditions by the transmitting/receiving end of data, for example, determination conditions in which the encryption and decryption processing unit 201 is used for encryption with respect to a transmitting/receiving end required for the transmission and reception of a large amount of data and the encryption and decryption processing unit 301 is used for encryption with respect to a transmitting/receiving end required for the transmission and reception of a small amount of data will be considered. In this case, the conditions are input to the management terminal 8 in the form of a transmitting/receiving end using the encryption and decryption processing unit 201 and a transmitting/receiving end using the encryption and decryption processing unit 301, and the conditions are then stored in the control memory area of the memory unit 21 in the form of a table.

Further, with respect to the packet size of data communication, the following conditions can be considered: when the packet size is larger than a predetermined packet size (for example, 2 kB), the encryption process is performed by the encryption and decryption processing unit 201, and when the packet size is smaller than the predetermined packet size, the encryption process is performed by the encryption and decryption processing unit 301. In these conditions, the encryption and decryption processing units 201 and 301 decide the conditions by analyzing the packet size indicated in the packet header. Alternatively, the microprocessor 100 may analyze the packet size and then command the encryption and decryption processing units 201 and 301 to perform the encryption process.

Figure 23:
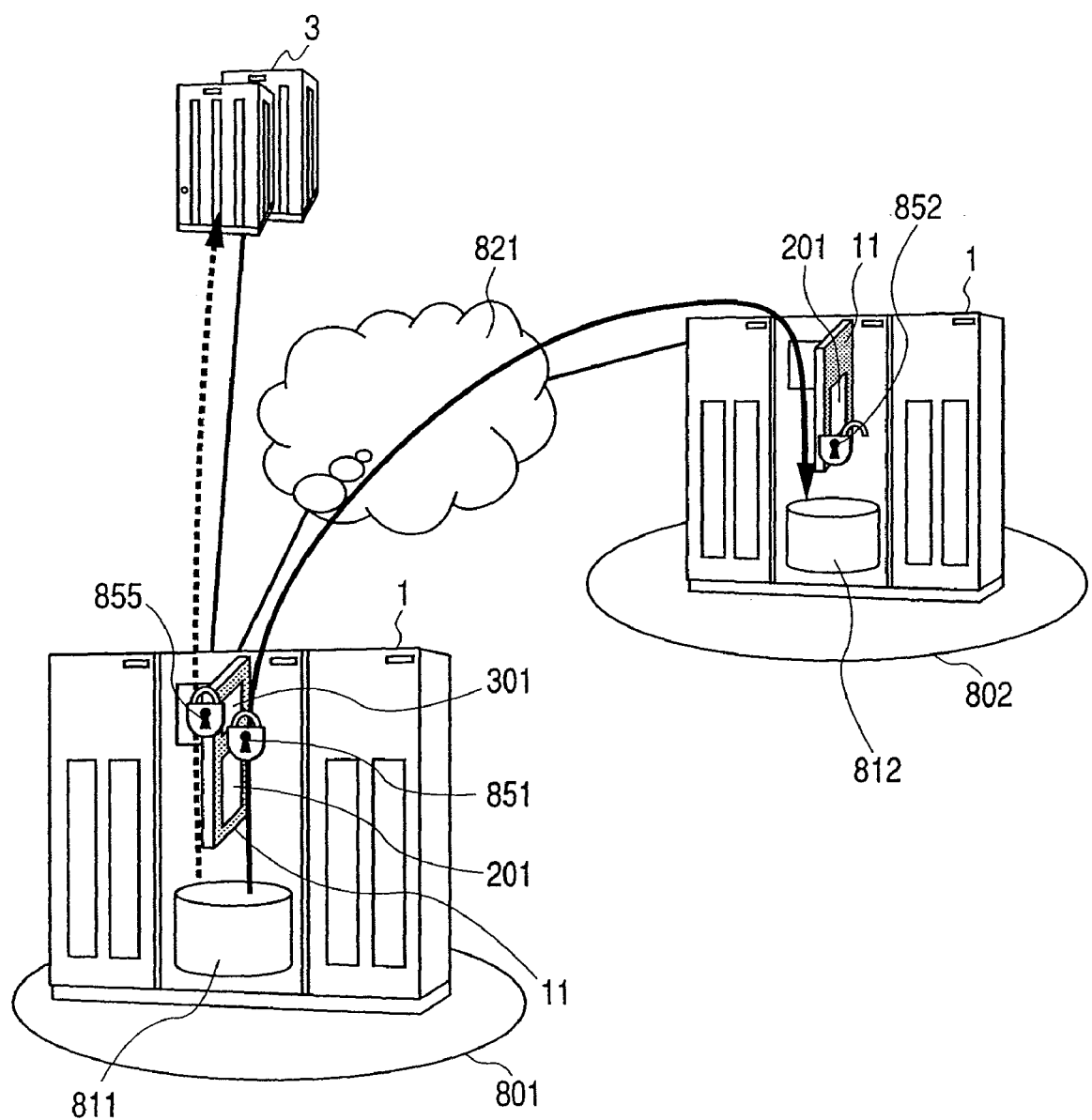
FIG. 23 is a diagram illustrating the data communication carried out between a server and the storage system and the data communication carried out between two storage systems.

FIG. 23 is a view illustrating an example of the selection of one of the encryption and decryption processing units 201 and 301 to be used by a transmitting/receiving end. FIG. 23 shows an example of the configuration of disaster recovery for executing the remote copy of data between the storage system 1 in the main site 801 and the storage system 1 in the remote site 802. The storage system 1 in the main site 801 is connected to the server 3 and the storage system 1 in the remote site 802 through a wide area network (a wide area IP network). The server 3 may be directly connected to the storage system 1 of the main site 801, or it may be connected thereto through LAN.

When a transmitting/receiving end is the server 3, the channel IF unit 11 of the storage system 1 in the main site 801 executes the encryption and decryption of data using the encryption and decryption processing unit 301, since the block cipher that is generally used in the IPsec protocol on the IP network is used. In addition, when a transmitting/receiving end is the storage system 1 of the remote site 802, the encryption and decryption of data is executed by the encryption and decryption processing process 201 using the stream cipher, since high-speed data transmission is required.

In the storage system 1 of the main site 801, based on the source and destination of data transmission indicated in the header information of the data packet, the encryption and decryption processing units 201 and 301 in the channel IF unit 11 determine whether to perform the encryption process using the above-mentioned method (for example, the register value plus the header information of the data packet). That is, when the encryption process is performed, the encryption and decryption processing units 201 and 301 execute the processes. However, when the encryption process is not performed, they pass data without executing the processes. However, instead of determining the destination of data, etc., in the respective encryption and decryption processing units, as described above, the microprocessor 100 may select one of the encryption and decryption processing units 201 and 301 to perform the encryption process, based on the source and destination of data indicated in the header information of the data packet, and then it may command the corresponding encryption and decryption processing unit to execute the process.

Further, as described with reference to FIGS. 12 and 13, the conditions for selecting one of the encryption and decryption processing units to perform the encryption process are previously input to the management terminal 8 by the administrator and are then stored in the control memory area of the memory unit 21 as a condition table. Subsequently, the conditions are set in the register of each of the encryption and decryption processing units.

As shown in FIGS. 12 and 13, the encryption and decryption processing unit 201 is provided in the transfer controller 103. However, the encryption and decryption processing unit 201 may be arranged as illustrated in FIGS. 4 to 9 and 21.

According to the present embodiment, the encryption and decryption of data can be executed using the cipher algorithm included in the communication conditions. In addition, the present embodiment can obtain the same effects as those attained in the first embodiment.

Figure 16:
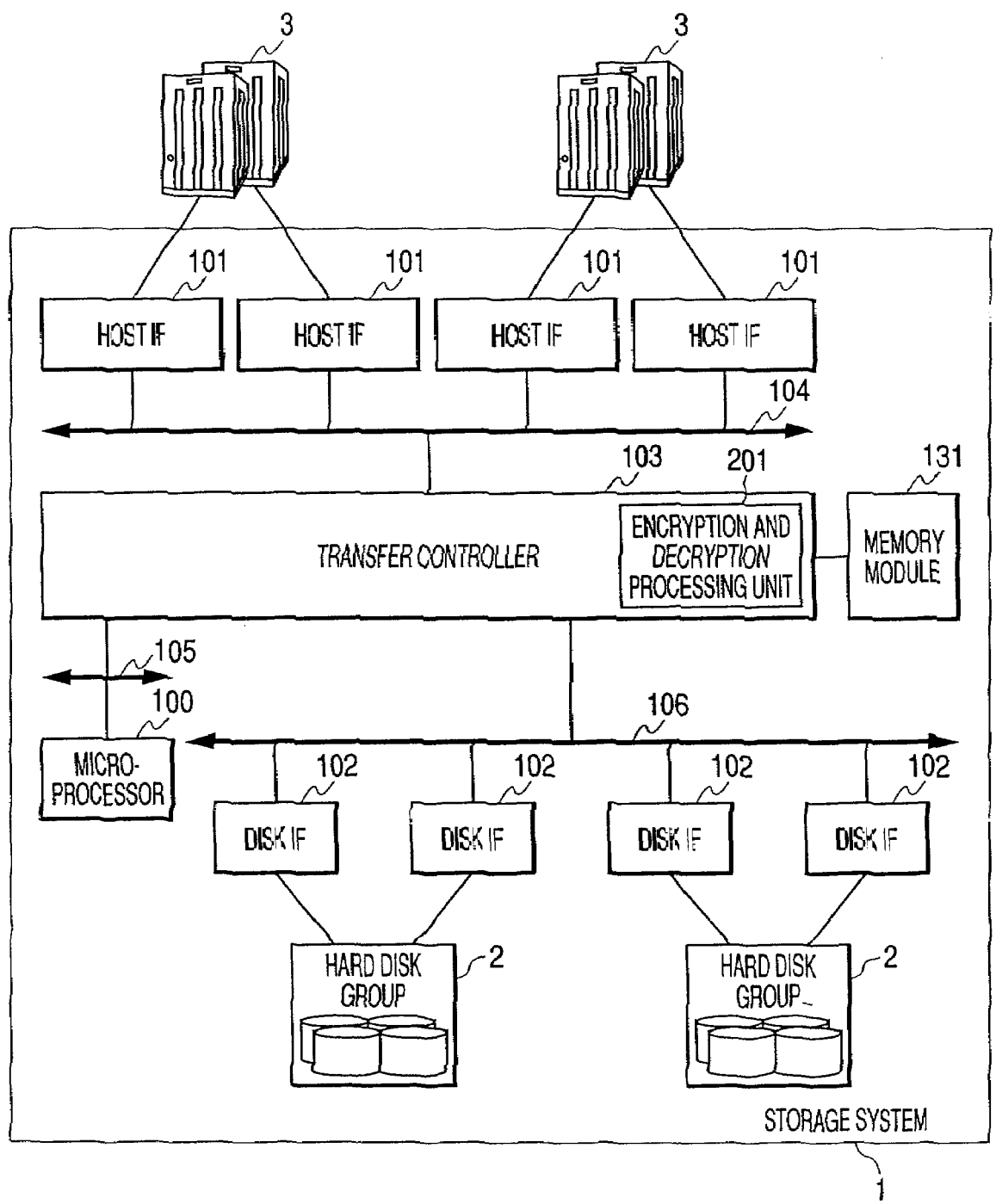
FIG. 16 is a block diagram illustrating another configuration of the storage system.
Figure 17:
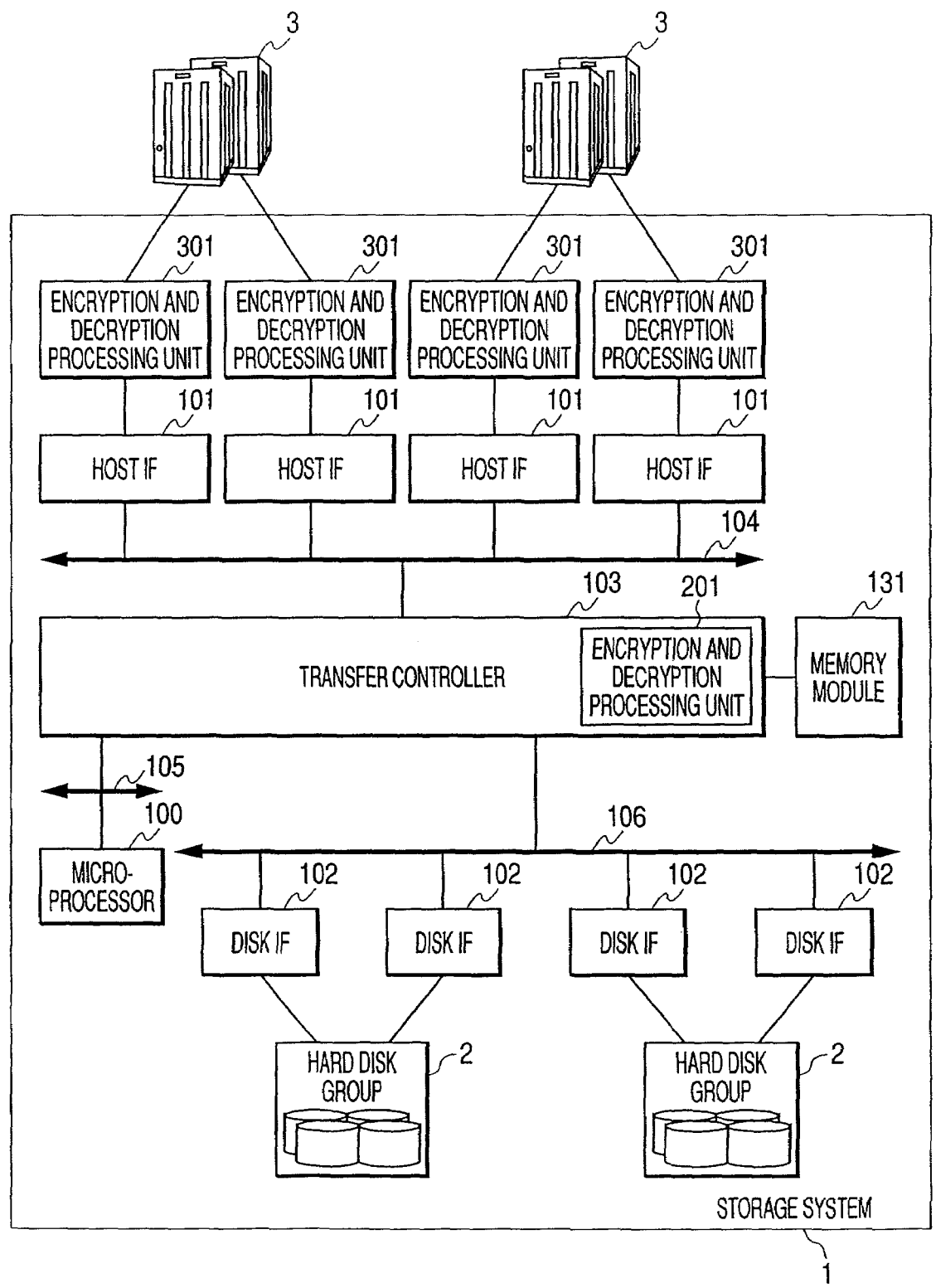
FIG. 17 is a block diagram illustrating still another configuration of the storage system.

FIGS. 16 and 17 illustrate configurations according to the third embodiment.

In the configuration of the storage system 1 shown in FIG. 16, the channel IF unit 11 and the disk IF unit 16 shown in FIG. 1 are integrated into one unit. That is, the disk IF 102 is connected to the transfer controller 103 of the channel IF unit 11 shown in FIG. 3 through the common bus 106. In addition, a memory module 131 serves as the cache memory and the control memory. Further, switches may be used instead of the common buses 104 and 106.

FIG. 17 is a view illustrating the configuration of a modification of the storage system shown in FIG. 16 in which two types of encryption and decryption processing units 201 and 301 are provided. In this case, similar to the second embodiment, the microprocessor 100 selects one of the encryption and decryption processing units 201 and 301 to perform the encryption and decryption processes according to the conditions previously determined by the management terminal, and it commands the selected one to execute the processes.

The storage system 1 of the present embodiment is different from the storage system 1 shown in FIG. 1 in that the function of the transfer controller 106 in the disk IF unit 16 is integrated into the transfer controller 103, that only one microprocessor 100 performs the processes to be executed by the respective processors 100 in the channel IF unit 11 and the disk IF unit 16, and that the memory module 131 is used for the cache memory and the control memory.

The read/write processes of data in the present embodiment are basically the same as those in the first embodiment, except for the following points. In other words, since the present embodiment substitutes the transfer controller 103 and the memory module 131 for the memory unit 21 (the function of the memory controller 125 shown in FIG. 1 is integrated into the transfer controller 103 and the memory module 131 serves as the memory module 127), the microprocessor 101 determines whether the request data is present in the cache memory (the memory module 131). Further, in the data transmission, since the memory unit 21 does not exist, data is transmitted to the memory module 131. In addition, since the disk IF 102 is connected to the transfer controller 103 through the common bus 106 in the absence of the disk IF unit 16, the microprocessor 100, taking charge of the process of the host IF, directly commands the host IF 102 to transmit data between the hard disk group 2 and the cache memory.

In the configurations shown in FIGS. 16 and 17, the encryption and decryption processing unit 201 is provided in the transfer controller 103. However, the encryption and decryption processing unit 201 may be arranged as shown in FIGS. 4 to 9 and 21.

Also, the present embodiment can obtain the same effects as those attained in the first embodiment.

Figure 24:
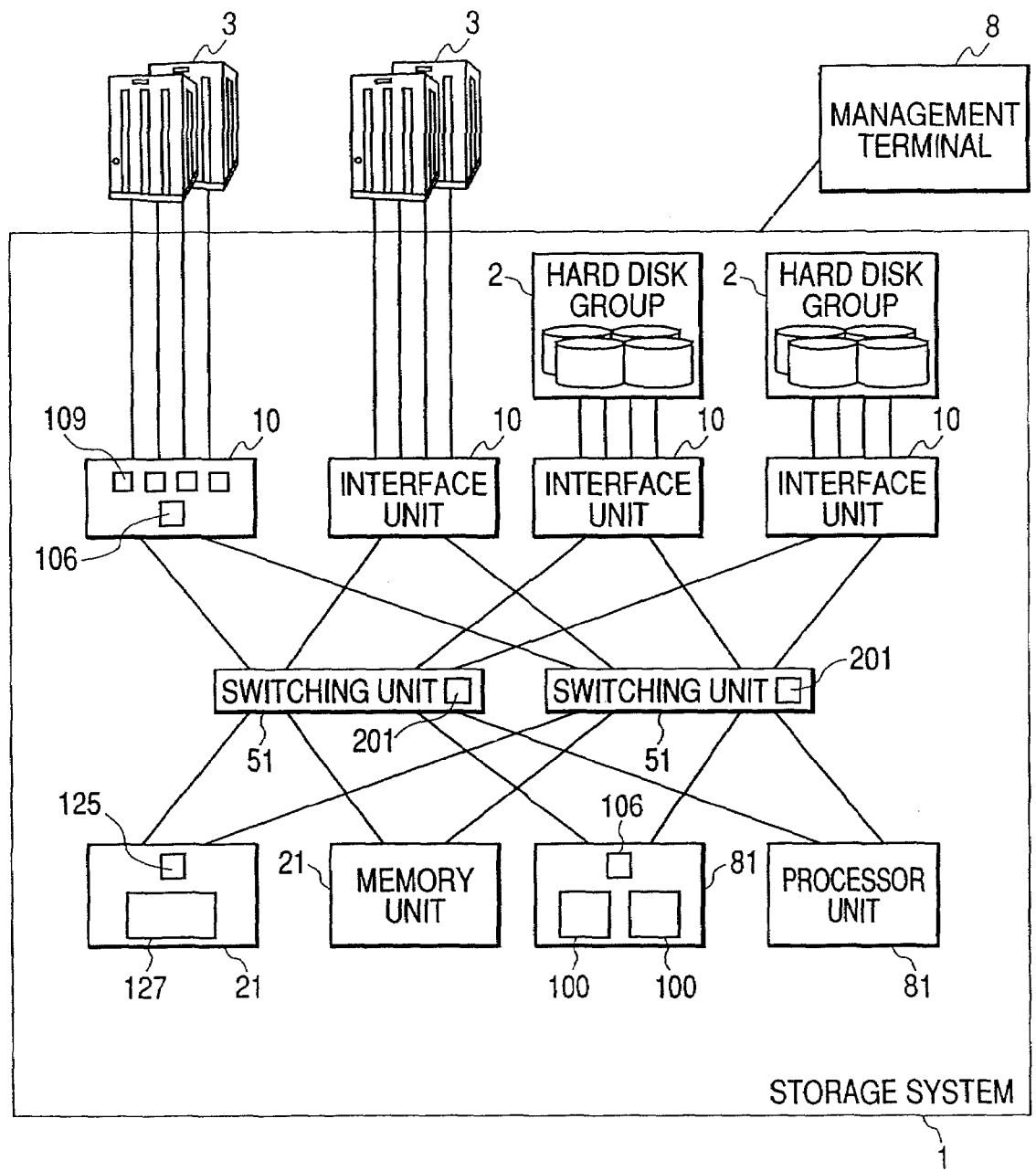
FIG. 24 is a block diagram illustrating still another configuration of the storage system 1.
Figure 25:
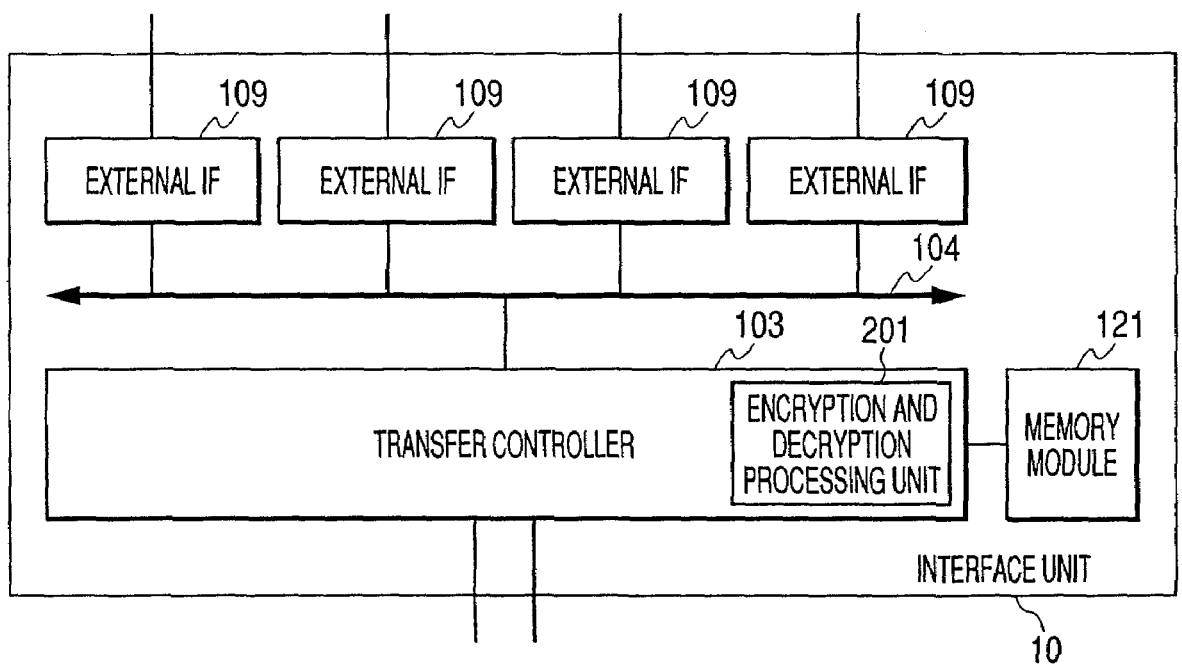
FIG. 25 is a block diagram illustrating the configuration of an interface unit.

FIGS. 24 and 25 are views illustrating configurations according to the fourth embodiment.

The storage system 1 shown in FIG. 24 comprises interface units 10 connected to servers 3 or hard disk groups 2, memory units 21, processor units 81, and switching units 51, each interconnecting the interface unit 10, the memory unit 21, and the processor unit 81. In addition, the management terminal 8 is connected to the storage system 1.

The interface unit 10 is different in configuration from the channel IF unit 11 and the disk IF unit 16 shown in FIG. 1 in that the microprocessors 100 are not provided, so that it can be connected to both the server 3 and the hard disk group 2. The microprocessor unit 81 is mounted such that the microprocessors 100 are respectively present in the channel IF unit 11 and the disk IF unit 16 on a separate adapter board. In addition, the switching unit 51 has the encryption and decryption processing unit 201.

As described above, the configuration of the interface unit 10 is different from that of the disk IF unit 16 shown in FIG. 2 in that the microprocessor 100 and the common bus 105 are removed and that an external IF 109 serves as the disk IF 102. Herein, the external IF 109 may be directly connected to the transfer controller 106 without the common bus 104 being interposed therebetween.

The processor unit 81 comprises the transfer controller 106 connected to the switching unit 51 and a plurality of microprocessors 100 connected to the transfer controller 106. However, the microprocessors 100 may be connected to the transfer controller 106 through any one of the buses, switches, and signal lines.

The read/write processes of data in the present embodiment are different from those in the first embodiment in accordance with the following points. Specifically, the communication between the microprocessor 100 and the host IF 101 in the channel IF unit 11 is replaced by the communication between the external IF 109 in the interface unit 10 connected to the server 3 and the microprocessor 100 in the processor unit 81, with the switching unit 51 being interposed therebetween. In addition, the communication between the disk IF 102 in the disk IF unit 16 and the microprocessor 100 is replaced by the communication between the external IF 109 in the interface unit 10 connected to the hard disk group 2 and the microprocessor 100 in the processor unit 81, with the switching unit 51 being interposed therebetween. Further, the encryption process of data is not executed in the transfer controller 106 at the time of the read process of data, but the encryption process is performed in the encryption and decryption processing unit 201 of the switching unit 51 during the transmission of the request data from the memory module 127 to the transfer controller 106. Furthermore, the decryption process of data is not executed in the transfer controller 106 at the time of the write process of data, but the decryption process is performed in the encryption and decryption processing unit 201 of the switching unit 51 during the transmission of the request data from the transfer controller 106 to the memory module 127.

FIG. 25 is a view illustrating another configuration of the interface unit 10. In this configuration, the encryption and decryption processing unit 201 is provided in the transfer controller 103, similar to the first embodiment shown in FIG. 3. In this case, the encryption and decryption processing unit 201 is not provided in the switching unit 51. In the read/write processes of data in this configuration, similar to the first embodiment, the encryption/decryption processes of data are executed in the encryption and decryption processing unit 201 in the transfer controller 103.

In FIG. 25, the encryption and decryption processing unit 201 is provided in the transfer controller 103. However, the encryption and decryption processing unit 201 may be arranged as shown in FIGS. 4 to 9 and 21.

In the configurations shown in FIGS. 24 and 25, the encryption and decryption processing unit 301 may be provided as shown in FIG. 12, and, similar to the second embodiment, the microprocessor 100 may select one of the encryption and decryption processing units 201 and 301 to perform the encryption and decryption processes according to the conditions previously determined by the management terminal, and then it may command the selected one to execute the processes.

In this way, the present embodiment can also obtain the same effects as those attained in the first embodiment.

In the storage systems 1 according to the first to fourth embodiments, the encryption of data is performed when data is transmitted or received to or from the server 3 or another storage system 1. Contrary to the above, in the fifth embodiment, a configuration in which plaintext data to be transmitted to the storage system 1 is encrypted and stored in the hard disk group 2, and the encryption data stored in the hard disk group 2 is decrypted and transmitted to the storage system 1, will be described.

However, when encryption data is transmitted to the server 3, the encryption data is stored in the hard disk group 2 as it is, and the data is transmitted without decryption at the time of the read of data. Herein, the communication of the encryption data is executed by previously making an agreement required for the encryption communication between a source apparatus and a destination apparatus (in this case, the server 3 and the storage system 1) before communication. Therefore, by checking the source of data, it is possible to determine whether data is encrypted or not.

In the present embodiment, when plaintext data is encrypted to perform read/write processes, the sequence of the encryption/decryption processes is reversed, compared to the case in which the encryption/decryption processes are executed at the time of the transmission/reception of data described in connection with the first embodiment. That is, in the storage system 1, the encryption and decryption processing unit 201 encrypts the data to be transmitted as plaintext at the time of the writing of data, and then the encryption data is stored in the hard disk group 2. In addition, in the storage system 1, at the time of the reading of data, the encryption and decryption processing unit 201 decrypts the encryption data read out from the hard disk group 2, and the read data is transmitted as plaintext. In the present embodiment, the read/write processes of data are the same as those outlined in the flow charts shown in FIGS. 14 and 15, except that the sequence of the encryption/decryption processes is reversed.

Figure 26:
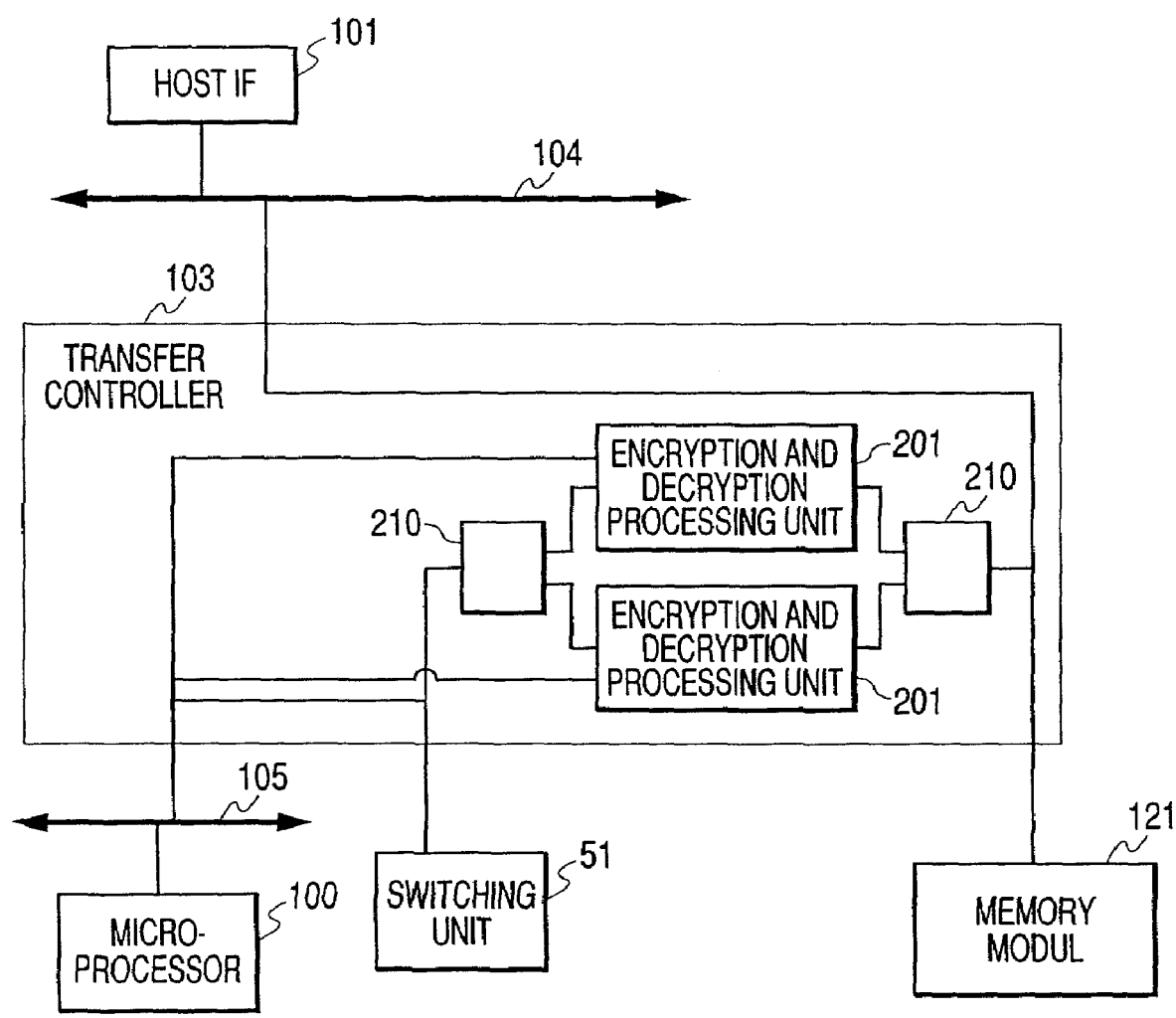
FIG. 26 is a diagram illustrating another configuration of the encryption and decryption processing unit.

FIG. 26 is a view illustrating a configuration in which the encryption and decryption processing unit 201 is duplexed in the present embodiment. Herein, the system configuration in the present embodiment is basically the same as that in the fourth embodiment (FIG. 24) and will be described below. When encrypting data at the time of the write process of data, the storage system 1 encrypts data using two encryption and decryption processing units 201 and compares two encryption data in a data comparing unit 210 connected to the switching unit 51. As a result of comparison, when the two encryption data coincide with each other, the storage system 1 transmits the two encryption data to the memory unit 21 through the switching unit 51 and then executes follow-up processes. On the contrary, when the two data do not coincide with each other, the data comparing unit 210 identifies this fact to the microprocessor 100 as an error.

Meanwhile, when decrypting data at the time of the read process of data, the storage system 1 decrypts data using two encryption and decryption processing units 201. Then, the data comparing unit 210 connected to the memory module 121 compares two decryption data. As a result of comparison, when the two decryption data coincide with each other, the storage system 1 stores the two decryption data in the memory module 121 and then executes follow-up processes. On the contrary, when the two decryption data do not coincide with each other, the data comparing unit 210 identifies this fact to the microprocessor 100 as an error.

In this way, it is possible to improve the reliability of encryption data/decryption data. Further, the configuration in which the encryption and decryption processing unit 201 is duplexed can be applied to the respective embodiments described above.

Figure 22:
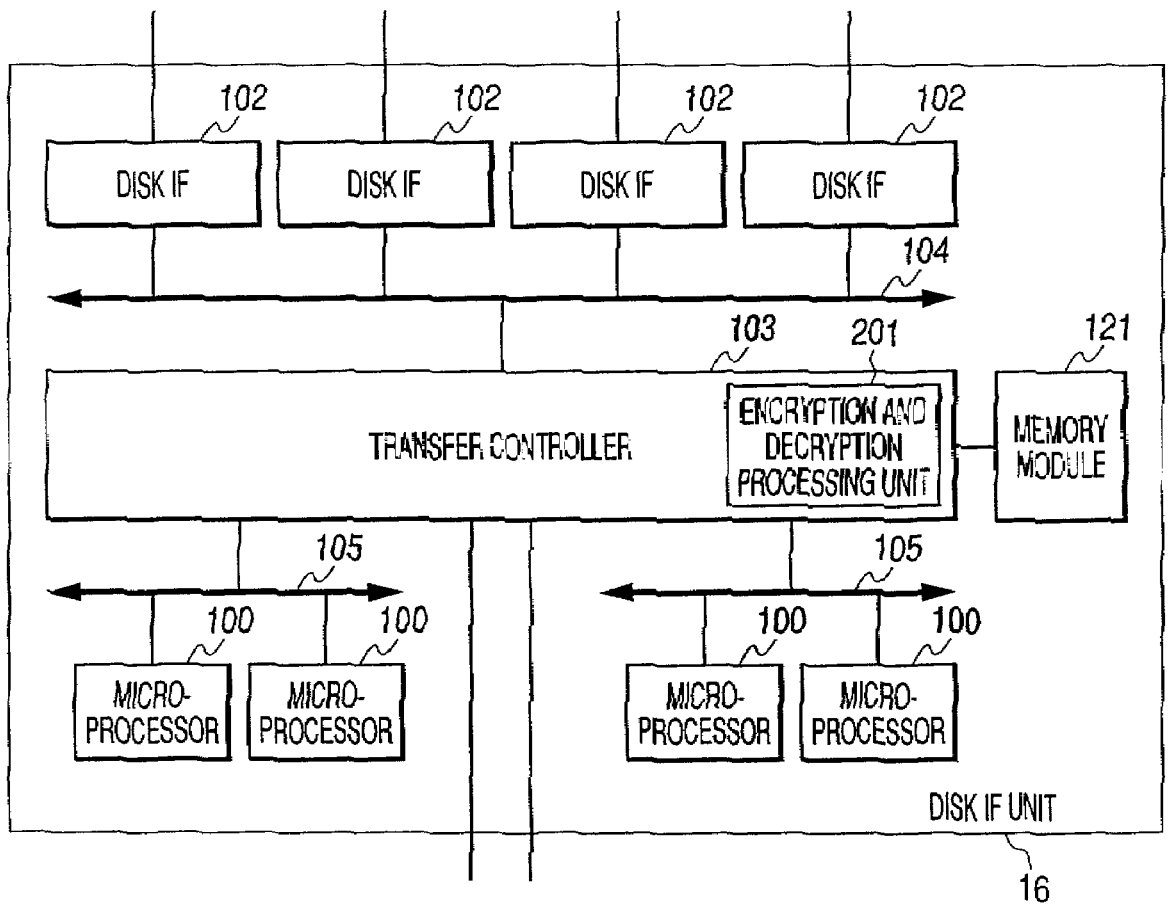
FIG. 22 is a block diagram illustrating another configuration of the disk IF unit.

FIG. 22 is a view illustrating a configuration in which the encryption and decryption processing unit 201 is provided in the transfer controller 103 of the disk IF unit 16 connected to the hard disk group 2. In this case, it is not necessary to provide the encryption and decryption processing unit 201 in the switching unit 51. In addition, when the fifth embodiment is implemented by the configuration shown in FIG. 1, the encryption and decryption processing unit 201 is provided in the disk IF unit 16.

According to the present embodiment, when encrypting data to store in the hard disk group 2, the encryption and decryption processing unit 201 is provided in the disk IF unit 16 or the interface unit 10 having the disk IF 102 or the external IF 109 connected to the hard disk group 2, as shown in FIG. 22. In this way, it is possible to effectively perform a process of transmitting encryption data.

According to the present embodiment, data is encrypted and is then stored in the storage system 1. Therefore, it is impossible for people other than the user of data to operate on the data, thereby improving the security of the stored data.

Hereinafter, a method of managing the cryptographic key used for the encryption/decryption processes in the above-mentioned embodiments will be described.

Figure 27:
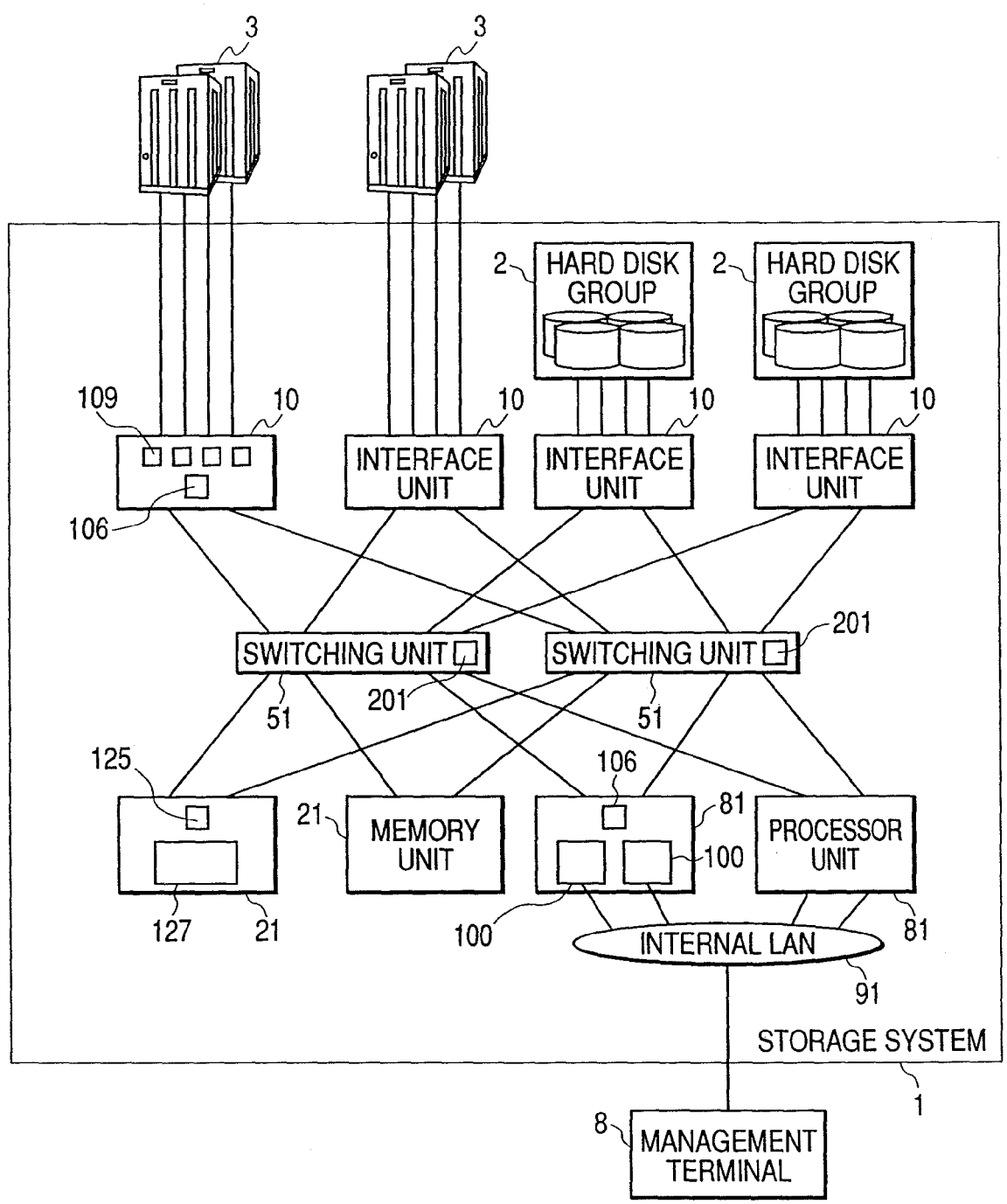
FIG. 27 is a diagram illustrating yet another configuration of the storage system 1.

FIG. 27 is a view illustrating the management of the cryptographic key in the storage system 1 shown in FIG. 24. As described above, the management terminal 8 is connected to the storage system 1. More specifically, the management terminal 8 is connected to the microprocessor 100 in the processor unit 81 through the internal LAN 91. An administrator of the storage system 1 executes the setup and monitoring of the storage system 1 and the collection of information on the operation and failure of the storage system 1 through the management terminal 8.

As described in connection with the first embodiment, in transmitting or receiving data using a cipher, before starting communication, the storage system 1 previously executes an exchange of information with a transmitting/receiving end to secretly share a cryptographic key. Therefore, the storage system 1 encrypts data using the shared cryptographic key previously exchanged with the transmitting/receiving end. After the cryptographic key is shared, the microprocessor 100 stores information on the cryptographic key in the control memory area of the memory module 127 in the memory unit 21. In addition, the microprocessor 100 transmits the information on the cryptographic key to the encryption and decryption processing unit 201 at the time of encryption.

In order to manage the storage system, the administrator for administering the storage system 1 generally accesses the control memory area through the microprocessor 100 using the management terminal 8 to retrieve the information stored in the memory. In this case, the administrator can acquire information on the cryptographic key stored in the control memory area and retrieve the encryption data stored in the storage system 1 using the information. That is, there is a possibility that the administrator will see the data being used by a user, which should not be seen by the administrator without permission.

In the present embodiment, in order to remove the above-mentioned possibility, the cryptographic key is managed such that an unspecified number of the general public does not access a portion of the control memory area in which the cryptographic key information is stored. For example, the management terminal 8 accesses the control memory region through the microprocessor 100. In the storage system 1, first, user authentication is performed when accessing the microprocessor 100. According to the user authentication, the microprocessor 100 checks whether the user who has accessed the system has an access key to a portion of the control memory area in which the cryptographic key information is stored.

As a result of this check, when the user who has accessed the system does not have the access key to the control memory area, the microprocessor 100 does not permit the user to access the control memory area. In addition, when access to the control memory area is permitted, but the user does not have the access key to the memory area in which the cryptographic key information is stored, the microprocessor 100 opens only portions of the control memory area in which the cryptographic key information is not stored to the user who has accessed the system.

Further, information on the user who is sending an access request to the memory area in which the cryptographic key information is stored may be written in the microprocessor 100. In this way, it is possible to check whether an illegal access is being performed, and the check results can be applied to provide a measure to improve security, such as a more strict check.

According to the above-mentioned configuration, it is possible to prevent people other than the user of data from reading the data, thereby improving the security of the data stored in the storage system 1.

Figure 28:
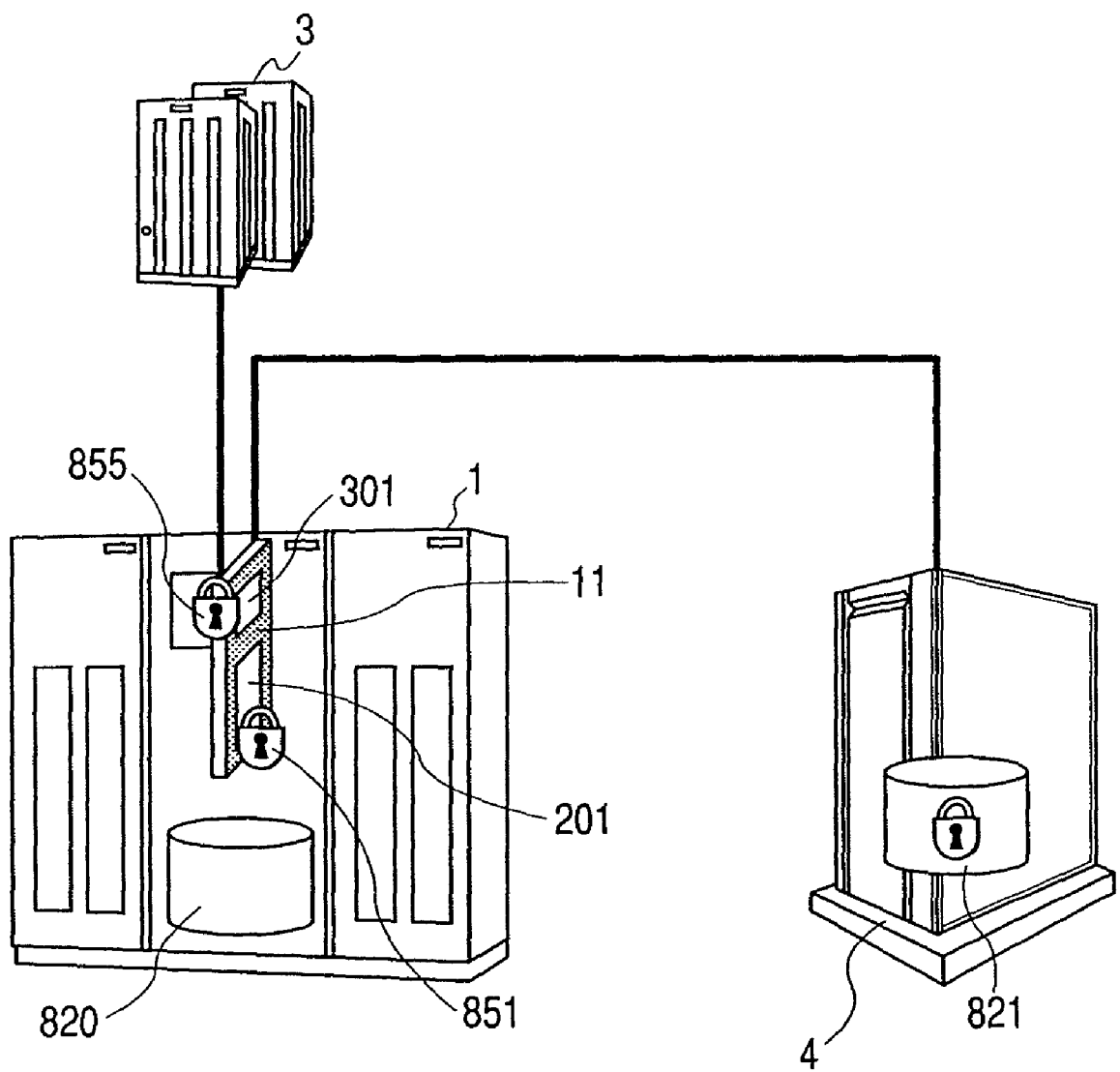
FIG. 28 is a diagram illustrating the connection among the server, the storage system, and an external storage system.

FIG. 28 is a view illustrating the configuration of a storage system 1 according to the sixth embodiment. The internal configuration of the storage system 1 is the same as that shown in FIGS. 1 and 12. However, configurations other than the above can be used. As shown in FIG. 28, another storage system 4 is connected to the channel IF unit 11 connected to the server 3. In this case, the storage system 1 stores information on a storage area (hereinafter referred to as a 'volume') supplied by the storage system 4 in the control memory area of the memory unit 21 and stores the data to be stored (or read from) in the storage system 4 in the cache memory area.

The microprocessor 100 in the channel IF unit 11 connected to the storage system 4 manages the volume supplied by the storage system 4, based on the information stored in the control memory area. For example, the microprocessor 100 allocates the volume supplied by the storage system 4 to the server 3 as a volume to be supplied by the storage system 1. Therefore, it is possible for the server 3 to access the volume of the storage system 4 through the storage system 1.

In this case, the storage system 1 collectively manages the volume constructed by the hard disk group 2 provided therein and the volume supplied by the storage system 4.

In the present embodiment, in a case in which data is written from the storage system 1 to the storage system 4, when data is transmitted from the storage system 1, the encryption and decryption processing unit 201 in the channel IF unit 11 encrypts the data. In addition, the storage system 4 stores the encryption data transmitted from the storage system 1 as it is (without decryption). At the time of reading this data, the storage system 4 transmits the stored encryption data to storage system 1 as it is, and then the storage system 1 decrypts the encryption data using the encryption and decryption processing unit 201 in the channel IF unit 11.

In FIG. 28, it is assumed that the server 3 and the storage system 4 are connected to the same channel IF unit 11. Therefore, when data transmission is performed between the server 3 connected to the channel IF unit 11 and the storage system 4, the data transmission between the host IF 101 connected to the server 3 and the host IF 101 connected to the storage system 4 is performed via the common bus 104, the transfer controller 103, and the memory module 121. When the channel IF unit 11 connected to the server 3 and the channel IF unit 11 connected to the storage system 4 are different from each other, the data transmission between the host IF 101 connected to the server 3 and the host IF 101 connected to the storage system 4 is performed through the switching unit 51. At that time, the storage system 1 may cache the data to be transmitted in cache memory area of the memory unit 21. Therefore, it is possible to improve the efficiency of the data transmission between the server 3 and the storage system 4.

Furthermore, similar to the second embodiment, in the present embodiment, the microprocessor 100 in the channel IF unit 11 may select one of the encryption and decryption processing units 201 and 301 to perform encryption and decryption processes according to the conditions previously determined by the management terminal 8 and to command the selected one 201 or 301 to perform the processes. In the present embodiment, an encryption process 855 in the data communication between the server 3 and the storage system 1 is performed in the encryption and decryption processing unit 301 using a block cipher that is generally used in the IPsec protocol on an IP network. Meanwhile, an encryption process 851 in the data communication between the storage system 1 and the storage system 4 is performed in the encryption and decryption processing unit 201 using a stream cipher that can be processed at high speed since high-speed data transmission is required therebetween.

According to the present embodiment, when disconnecting the storage system 4 from the storage system 1 and directly connecting the server 3 to the storage system 4 to access the stored data, it is impossible to read the contents of the data, thereby improving the security of the data stored in the storage system 4.

According to the present embodiment, it is possible to provide a storage system that is capable of secure and high-speed data transmission or data storage.

What is claimed is:

1. A storage system comprising:
   a first interface unit coupled to a computer and having a transfer controller and a second memory unit;
   a disk device;
   a second interface unit coupled to the disk device;
   a first memory unit having a cache memory for storing data to be read or written from or to the computer of the disk device and a control memory for storing control information;
   a first processor controlling data transmissions between the computer and the disk device;
   a connecting unit coupled to the first interface, the second interface unit, the first memory unit, and a first processor,
   wherein the connecting unit has an encryption and decryption unit for encrypting data to be transmitted to the computer and for decrypting data received from the computer,
   wherein, upon receipt of a read command, the encryption and decryption unit encrypts a data read from the first memory unit,
   wherein the transfer controller writes the encrypted data in the second memory unit, and reads the encrypted data from the second memory unit to transmit the encrypted data to the computer via the first connecting unit.

2. A storage system according to claim 1, wherein cryptographic key information to be used in the encryption and decryption unit is stored in the first memory unit,
   wherein the first interface unit determines whether access for allowing the cryptographic key information stored in the first memory unit to be read out satisfies predetermined conditions and determines whether to permit the read of the cryptographic key information according to the result of the determination, and
   wherein the predetermined conditions mean conditions in which only authorized persons access the first memory unit to read data.

3. A storage system according to claim 1, comprising a microprocessor included in the second interface unit for controlling data transmission between the computer and the disk device.

4. A storage system according to claim 1, wherein the first interface unit includes a microprocessor, and further wherein the first interface unit is enabled to store a secret key, and wherein the microprocessor is enabled to transmit the secret key to the encryption and decryption unit when data transmission from the first interface unit to the computer occurs.

5. A storage system comprising:
   a first interface unit having a first connecting unit coupled to a computer and a second connecting unit coupled to an interconnecting network;
   a disk device;
   a second interface unit coupled to the interconnecting network and the disk device;
   a first memory unit coupled to the interconnecting network; and
   wherein the first interface unit has an encryption and decryption processing unit for decrypting data to be transmitted to the computer and for encrypting unencrypted data received from the computer and a second memory for storing the unencrypted data,
   wherein, upon receipt of a read command, the encryption and decryption processing unit decrypts data read under control of the second connecting unit from the first memory unit, and
   wherein the second connecting unit writes the unencrypted data in the second memory unit, and reads the unencrypted data from the second memory unit to transmit the unencrypted data to the computer via the first connecting unit.

6. A storage system according to claim 5, wherein the first interface unit determines whether data received from the computer is encrypted or unencrypted and operates to encrypt the data from the computer if it is unencrypted and operates to decrypt the data from the computer if it is unencrypted.

7. A storage system comprising:
   a first interface unit coupled to a computer and having a transfer controller and a second memory unit;
   a disk device;
   a second interface unit coupled to the disk device;
   a first memory unit having a cache memory for storing data to be read or written from or to the computer of the disk device and a control memory for storing control information;
   a first processor controlling data transmissions between the computer and the disk device;
   a connecting unit coupled to the first interface, the second interface unit, the first memory unit, and a first processor,
   wherein the connecting unit has an encryption and decryption unit for decrypting data to be transmitted to the computer and for encrypting data received from the computer,
   wherein, upon receipt of a read command, the encryption and decryption unit decrypts data read from the first memory unit,
   wherein the transfer controller writes the decrypted data in the second memory unit, and reads the decrypted data from the second memory unit to transmit the decrypted data to the computer via the first connecting unit.

8. A storage system according to claim 7, wherein the first interface unit determines whether data received from the computer is encrypted or unencrypted and operates to encrypt the data from the computer if it is unencrypted and operates to decrypt the data from the computer if it is unencrypted.

* * * * *